United States Patent
Yamaguchi et al.

(10) Patent No.: US 11,433,894 B2
(45) Date of Patent: Sep. 6, 2022

(54) DRIVING ASSISTANCE METHOD AND DRIVING ASSISTANCE DEVICE

(71) Applicant: Nissan Motor Co., Ltd., Yokohama (JP)

(72) Inventors: Shotaro Yamaguchi, Kanagawa (JP); Fang Fang, Kanagawa (JP); Takuya Nanri, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/442,514

(22) PCT Filed: Mar. 27, 2019

(86) PCT No.: PCT/IB2019/000377
§ 371 (c)(1),
(2) Date: Sep. 23, 2021

(87) PCT Pub. No.: WO2020/194015
PCT Pub. Date: Oct. 1, 2020

(65) Prior Publication Data
US 2022/0144273 A1    May 12, 2022

(51) Int. Cl.
*B60W 30/18*      (2012.01)
*B60W 30/095*     (2012.01)

(52) U.S. Cl.
CPC .. *B60W 30/18159* (2020.02); *B60W 30/0956* (2013.01); *B60W 2552/05* (2020.02);
(Continued)

(58) Field of Classification Search
CPC ....... B60W 30/0956; B60W 30/18159; B60W 2552/05; B60W 2552/50; B60W 2552/53;
(Continued)

(56) References Cited

U.S. PATENT DOCUMENTS

| | | | |
|---|---|---|---|
| 11,009,875 B2 * | 5/2021 | Charrow | B62D 15/025 |
| 2011/0095907 A1 * | 4/2011 | Kushi | B60W 30/0956 340/905 |

(Continued)

FOREIGN PATENT DOCUMENTS

| | | |
|---|---|---|
| JP | 2004-178194 A | 6/2004 |
| JP | 2010-211297 A | 9/2010 |

(Continued)

*Primary Examiner* — Anshul Sood
(74) *Attorney, Agent, or Firm* — Young Basile Hanlon & MacFarlane, P.C.

(57) ABSTRACT

A driving assistance method includes: detecting a first other vehicle entering an intersection on a first route where a host vehicle is traveling from a second route; predicting whether or not the first other vehicle will stop in the intersection, and predicting a stop position of the first other vehicle; calculating a minimum distance of a first gap between a vehicle body of the first other vehicle and a surrounding object around the first other vehicle or between the vehicle body of the first other vehicle and a road edge of a travel lane of the first other vehicle when the first other vehicle stops at the predicted stop position; and predicting according to the calculated minimum distance whether or not a second other vehicle, which is a following vehicle behind the first other vehicle, may slip through the first gap from behind the first other vehicle.

13 Claims, 13 Drawing Sheets

(52) U.S. Cl.
CPC ..... *B60W 2552/50* (2020.02); *B60W 2552/53* (2020.02); *B60W 2554/20* (2020.02); *B60W 2554/406* (2020.02); *B60W 2554/4029* (2020.02); *B60W 2554/4045* (2020.02); *B60W 2554/801* (2020.02); *B60W 2554/802* (2020.02); *B60W 2555/60* (2020.02)

(58) Field of Classification Search
CPC ..... B60W 2554/20; B60W 2554/4029; B60W 2554/4045; B60W 2554/406; B60W 2554/801; B60W 2554/802; B60W 2555/60
See application file for complete search history.

(56) References Cited

U.S. PATENT DOCUMENTS

| | | | |
|---|---|---|---|
| 2011/0095909 A1* | 4/2011 | Kushi | G08G 1/161 340/905 |
| 2012/0218093 A1 | 8/2012 | Yoshizawa et al. | |
| 2018/0218600 A1 | 8/2018 | Fujita | |
| 2018/0233049 A1* | 8/2018 | Ishii | G08G 1/162 |
| 2019/0108754 A1* | 4/2019 | Baek | B60W 30/18154 |
| 2020/0010118 A1 | 1/2020 | Fukaya et al. | |
| 2020/0086789 A1* | 3/2020 | Nowakowski | B60R 1/00 |

FOREIGN PATENT DOCUMENTS

| | | |
|---|---|---|
| JP | 2011-096105 A | 5/2011 |
| JP | 2018-158709 A | 10/2018 |

* cited by examiner

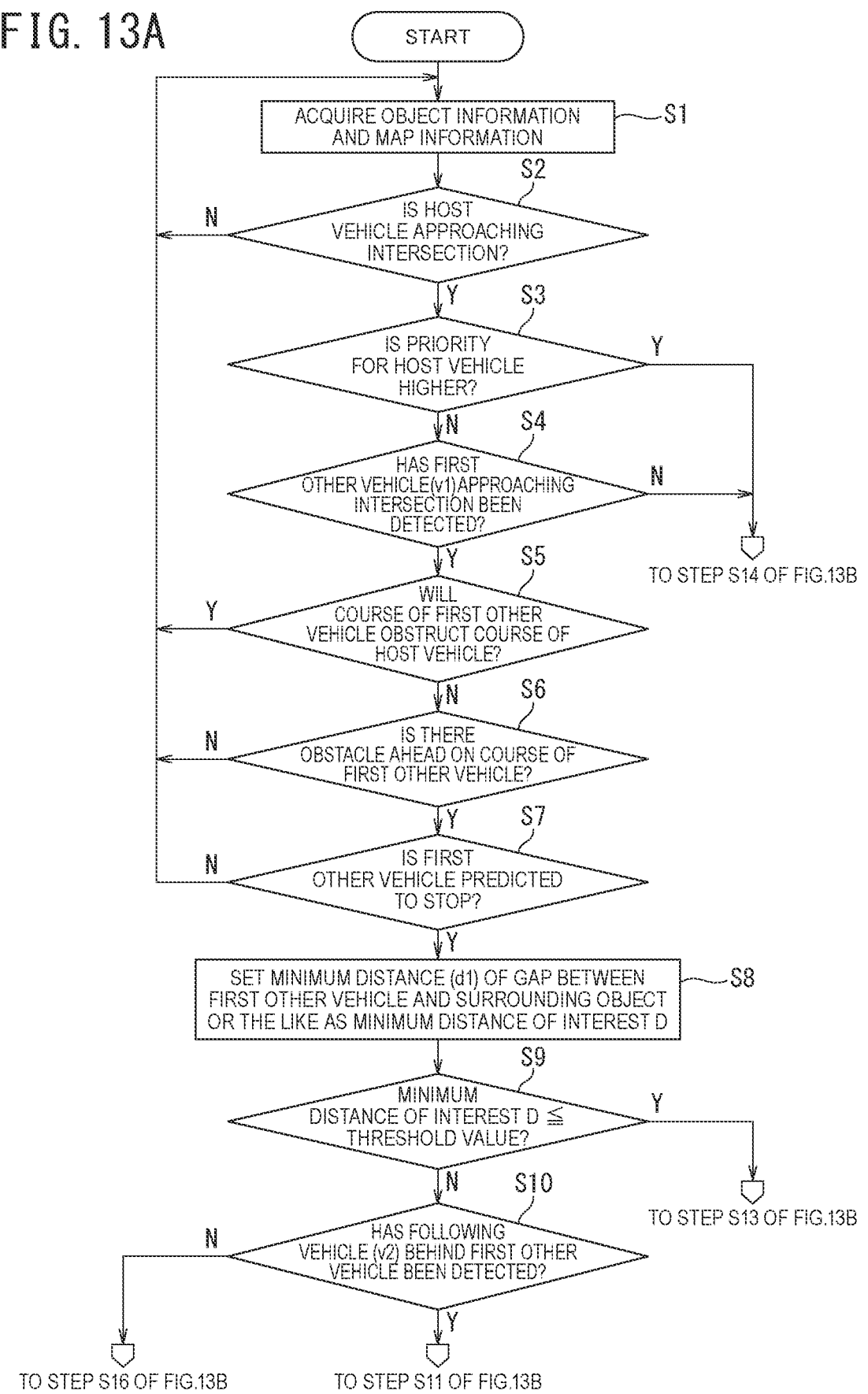

DRIVING ASSISTANCE METHOD AND DRIVING ASSISTANCE DEVICE

TECHNICAL FIELD

The present invention relates to a driving assistance method and a driving assistance device.

BACKGROUND

A technology described in JP 2011-096105 A is known as a technology for controlling travel of a host vehicle at an intersection. A driving assistance device described in JP 2011-096105 A provides a normative behavior candidate in which the risk of contact between obstacles around the host vehicle and the host vehicle is taken into consideration.

SUMMARY

When the host vehicle proceeds in an intersection on a travel route thereof and another vehicle enters the intersection from a route different from the travel route of the host vehicle, there may be a following vehicle behind the other vehicle. In such a case, even when the other vehicle entering the intersection is found not to hinder the travel of the host vehicle, the following vehicle that may be behind the other vehicle may slip past a side of the other vehicle and enter the intersection. Due to that, the host vehicle may not be able to proceed in the intersection.

An object of the present invention is to, even when another vehicle enters an intersection on a travel route of a host vehicle from a route different from the travel route of the host vehicle and there may be a following vehicle behind the other vehicle, enable judgment as to whether or not the following vehicle may slip past a side of the other vehicle.

According to an aspect of the present invention, there is provided a driving assistance method including: detecting a first other vehicle entering an intersection on a first route where a host vehicle is traveling from a second route different from the first route; predicting whether or not the first other vehicle will stop in the intersection, and predicting a stop position of the first other vehicle when the first other vehicle is predicted to stop in the intersection; calculating a minimum distance of a first gap between a vehicle body of the first other vehicle and a surrounding object around the first other vehicle or between the vehicle body of the first other vehicle and a road edge of a travel lane of the first other vehicle when the first other vehicle stops at the predicted stop position; and predicting according to the calculated minimum distance whether or not a second other vehicle, which is a following vehicle behind the first other vehicle, may slip through the first gap from behind the first other vehicle.

According to an aspect of the present invention, it is possible to, even when another vehicle enters an intersection on a travel route of a host vehicle from a route different from the travel route of the host vehicle and there may be a following vehicle behind the other vehicle, enable judgment as to whether or not the following vehicle may slip past a side of the other vehicle.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 13A is a flowchart (1) of the driving assistance method of the embodiment.

DETAILED DESCRIPTION

Hereinafter, embodiments of the present invention will be described with reference to the drawings. In the following description of the drawings, the same or similar portions are denoted by the same or similar reference signs. However, the drawings are schematic. The technological idea of the present invention may be variously modified within the technological scope defined in the appended claims.

(Structure)

A driving assistance device according to an embodiment is, for example, mounted in a vehicle (hereinafter, a vehicle mounted with the driving assistance device according to the embodiment is referred to as "host vehicle"). The driving assistance device according to the embodiment can execute, as driving assistance, autonomous driving for performing autonomous driving so that the host vehicle travels along a travel route and guidance for prompting a driver to drive so that the host vehicle travels along the travel route.

The autonomous driving includes cases where all controls of driving, braking, and steering of the host vehicle are executed without involvement of a vehicle occupant (the driver) and also cases where at least one control of either driving, braking or steering of the host vehicle is performed. The autonomous driving may be preceding vehicle following control, inter-vehicle distance control, lane departure prevention control, and the like.

Figure 1:
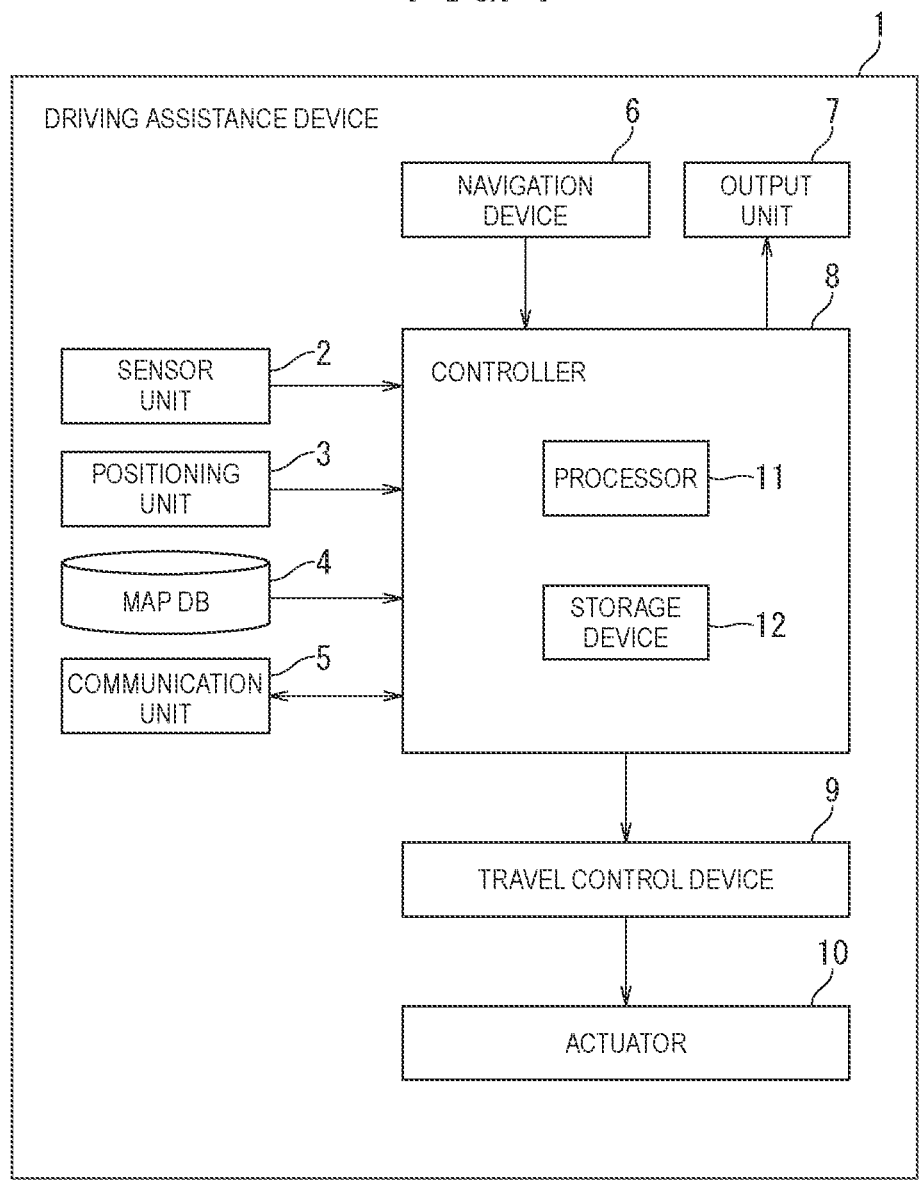
FIG. 1 is a block diagram illustrating an example of a driving assistance device according to an embodiment.

As illustrated in FIG. 1, a driving assistance device 1 according to the embodiment includes a sensor unit 2, a positioning unit 3, a map database (described as "MAP DB" in the drawing) 4, a communication unit 5, a navigation device 6, an output unit 7, a controller 8, a travel control device 9, and an actuator 10.

The sensor unit 2 detects an ambient environment of the host vehicle, for example, objects around the host vehicle. The sensor unit 2 detects the ambient environment of the host vehicle, including objects present around the host vehicle, relative positions between the host vehicle and the objects, distances between the host vehicle and the objects, and directions in which the objects are present.

The sensor unit 2 may include a range finder, such as a laser range-finder (LRF) or a radar, and a camera. The camera may be, for example, a stereo camera. The camera may be a monocular camera, through which the same object may imaged from a plurality of viewpoints to calculate a distance to the object. Alternatively, the distance to the object may be calculated on the basis of a ground contact position of the object detected from a captured image. The sensor unit 2 outputs ambient environment information that is information on the detected ambient environment to the controller 8.

The positioning unit 3 measures a current position of the host vehicle. The positioning unit 3 may include, for example, a global navigation satellite system (GNSS) receiver. The GNSS receiver is, for example, a global positioning system (GPS) receiver or the like, and receives radio waves from a plurality of navigation satellites to measure the current position of the host vehicle.

The positioning unit 3 may measure the current position of the host vehicle by, for example, odometry. The positioning unit 3 outputs the acquired current position of the host vehicle to the controller 8.

The map database 4 may store high-definition map data (hereinafter simply referred to as "high-definition map") suitable as a map for autonomous driving. The high-definition map is map data with higher definition than map data for navigation (hereinafter simply referred to as "navigation map"), and includes more detailed lane-based information than road-based information.

For example, the high-definition map includes, as the lane-based information, lane node information indicating a reference point on a lane reference line (for example, a center line in a lane) and lane link information indicating a lane section mode between lane nodes.

The lane node information includes identification number of the lane node, positional coordinates thereof, number of connected lane links, and identification numbers of the connected lane links. The lane link information includes identification number of the lane link, lane type, lane width, traffic lane line type, lane shape, lane marking shape, and lane reference line shape. The high-definition map further includes types and positional coordinates of features, such as traffic lights, stop lines, signs, buildings, utility poles, curbs, and pedestrian crossings located on or near the lane, and identification numbers of lane nodes and identification numbers of lane links corresponding to the positional coordinates of the features.

Since the high-definition map includes the lane-based node and link information, it is possible to identify a travel lane of the host vehicle in a travel route. The high-definition map includes coordinates that can represent positions in an extending direction and a widthwise direction of the lane. The high-definition map includes coordinates (for example, longitude, latitude, and altitude) that can represent positions in a three-dimensional space, so that lanes and the above-mentioned features can be described as shapes in the three-dimensional space.

Additionally, the map database 4 may store a navigation map. The navigation map includes road-based information. For example, the navigation map includes, as the road-based information, road node information indicating a reference point on a road reference line (for example, a center line of a road) and road link information indicating a road section mode between road nodes. The road node information includes identification number of the road node, positional coordinates thereof, number of connected road links, and identification numbers of the connected road links.

The road link information includes identification number of the road link, road standard, link length, number of lanes, road width, and speed limit.

In addition to the map information as above, the map database 4 may include priority information and the like, which are information on priority between roads intersecting at an intersection.

The communication unit 5 performs wireless communication with a communication device outside the host vehicle. The communication method by the communication unit 5 may be, for example, wireless communication by a public mobile phone network, vehicle-to-vehicle communication, road-to-vehicle communication, or satellite communication.

Note that the driving assistance device 1 may acquire the high-definition map and the navigation map through a telematics service such as vehicle-to-vehicle communication or road-to-vehicle communication by the communication unit 5 instead of the map database 4.

The use of the telematics service makes it unnecessary for the host vehicle to store map data with a large data capacity, which can suppress memory capacity. Additionally, the use of the telematics serve enables acquisition of updated map data, thereby enabling accurate understanding of actual driving situations, such as changes in the road structure and the presence of absence of a construction site. Furthermore, with the use of the telematics service, it is possible to use map data created on the basis of data collected from a plurality of other vehicles other than the host vehicle, so that accurate information can be obtained.

The navigation device 6 calculates a route from the current position of the host vehicle to a destination thereof. When the occupant operates the navigation device 6 to input the destination, a travel route from the current position to the destination is set by a method based on a graph search theory such as Dijkstra's algorithm or A*. The navigation device 6 provides route guidance for the occupant via the output unit 7 according to the travel route.

In addition, the set travel route is output to the controller 8 to use in autonomous driving of and driving assistance for the host vehicle.

The output unit 7 outputs various visual information and audio information. For example, the output unit 7 may display a map screen around the host vehicle and visual information on guidance of a recommended route. Additionally, for example, the output unit 7 may output audio guidance, such as driving guidance based on the set travel route and road guidance based on road map data around the host vehicle.

Furthermore, for example, the output unit 7 may display a guidance display or output an audio guidance message to assist driving of the driver by the controller 8.

The controller 8 is an electronic control unit (ECU) configured to perform driving assistance for the host vehicle. The controller 8 includes a processor 11 and peripheral components such as a storage device 12. The processor 11 may be, for example, a CPU or an MPU. The storage device 12 may include any of a semiconductor storage device, a magnetic storage device, and an optical storage device. The storage device 12 may include memories such as register, cache memory, and ROM and RAM used as primary storage devices. Note that the controller 8 may be embodied by a functional logic circuit set in a general-purpose semiconductor integrated circuit. For example, the controller 8 may include a programmable logic device (PLD), such as a field-programmable gate array (FPGA), or the like.

The controller 8 generates a travel trajectory that allows the host vehicle to travel on the travel route set by the navigation device 6, on the basis of the ambient environment information input from the sensor unit 2 and the current position of the host vehicle measured by the positioning unit 3. The controller 8 outputs the generated travel trajectory to the travel control device 9.

The travel control device 9 is an ECU configured to perform travel control of the host vehicle. The travel control device 9 includes a processor and peripheral components such as a storage device. The processor may be, for example, a CPU or an MPU. The storage device may include any of a semiconductor storage device, a magnetic storage device, and an optical storage device. The storage device may include memories such as register, cache memory, and ROM and RAM used as primary storage devices.

Note that the travel control device 9 may be embodied by a functional logic circuit set in a general-purpose semiconductor integrated circuit. For example, the travel control device 9 may include a PLD such as a FPGA, or the like. The travel control device 9 may be either an electronic control unit integrated with the controller 8 or a separate electronic control unit. The travel control device 9 drives the actuator 10 to allow the host vehicle to autonomously travel so that the host vehicle travels on the travel trajectory generated by the controller 8.

The actuator 10 operates the steering wheel, accelerator position, and braking device of the host vehicle in response to a control signal from the travel control device 9 to cause a vehicle behavior of the host vehicle to occur. The actuator 10 may include, for example, a steering actuator, an accelerator position actuator, and a brake control actuator. The steering actuator controls a steering direction and a steering amount of the steering wheel of the host vehicle. The accelerator position actuator controls the accelerator position of the host vehicle. The brake control actuator controls braking operation of the braking device of the host vehicle.

An outline of the driving assistance method by the driving assistance device 1 will be described with reference to FIG. 2.

There is an intersection (crossroad) ahead on a first route 21 where the host vehicle 20 is traveling, and a first other vehicle v1 enters the intersection from a second route 22 different from the first route 21. Additionally, a second other vehicle v2, which is a following vehicle behind the first other vehicle v1, is traveling behind the first other vehicle v1.

A future planned route p0 where the host vehicle 20 travels at the intersection is a right turn, and a course p1 of the first other vehicle v1 is also a right turn. Accordingly, the first other vehicle v1 does not obstruct the course of the host vehicle 20.

However, a priority for the host vehicle 20 to travel on the route p0 to turn right through the intersection is lower than a priority for the second other vehicle v2 to travel on a travel lane of the first other vehicle v1. In other words, at the intersection, the priority for the second other vehicle v2 that travels straight ahead is higher than the priority for the host vehicle 20 that travels on the route p0 to turn right at the intersection. Accordingly, the second other vehicle v2 may travel straight in the intersection. Due to that, even when the first other vehicle v1 is found not to obstruct the course of the host vehicle 20, the second other vehicle v2 may slip through between the first other vehicle v1 and a road edge and come straight in the intersection. It is therefore impossible to advance the host vehicle to the planned route p0 to travel through the intersection.

Thus, first, the controller 8 judges whether or not the first other vehicle v1 will stop according to the situation of a point ahead on the course p1 where the first other vehicle v1 passes through the intersection.

Figure 2:
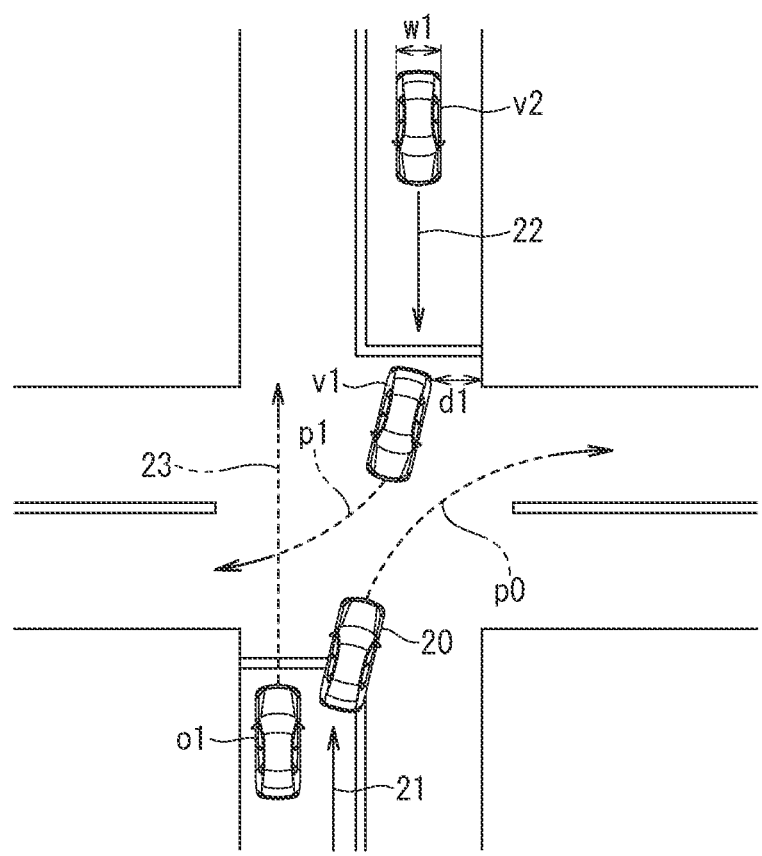
FIG. 2 is an illustrative diagram of an example of a driving assistance method according to the embodiment.

In the example of FIG. 2, a course 23 where a following vehicle of behind the host vehicle 20 travels straight through the intersection intersects with the course p1 where the first other vehicle v1 turns right, so that the following vehicle of becomes an obstacle on the course of the first other vehicle v1. Therefore, the controller 8 judges that the first other vehicle v1 will stop, and predicts a stop position of the first other vehicle v1.

Next, the controller 8 predicts whether or not the second other vehicle v2 may slip through between the first other vehicle v1 and the road edge of the travel lane from behind the stopped first other vehicle v1 and may enter the intersection. Specifically, first, a minimum distance d1 of a gap between the stopped first other vehicle v1 and the road edge of the travel lane is calculated. Hereinafter, the gap between the stopped first other vehicle v1 and the road edge of the travel lane may be referred to as "first gap".

For example, as illustrated in FIG. 2, the first gap may be a gap between a vehicle body of the first other vehicle v1 and the road edge of the travel lane of the first other vehicle v1, a gap between the vehicle body of the first other vehicle v1 and a curb, a gap between the vehicle body of the first other vehicle v1 and another object (for example, a wall, a guardrail, a utility pole, a sign, or the like provided at the road edge), or a gap between the vehicle body of the first other vehicle v1 and a plurality of other objects.

The controller 8 predicts whether or not the second other vehicle v2 may slip through the first gap from behind the first other vehicle v1 according to the calculated minimum distance d1. For example, when the minimum distance d1 of the first gap is equal to or less than a threshold value (for example, equal to or less than a predetermined dimension smaller enough than a vehicle width dimension of a motorcycle), the controller 8 judges that there is no possibility for the second other vehicle v2 to slip through the first gap from behind the first other vehicle v1.

In addition, for example, when the minimum distance d1 of the first gap is less than a vehicle width w1 of the second other vehicle v2, the controller 8 judges that there is no possibility for the second other vehicle v2 to slip through the first gap. On the contrary, when the minimum distance d1 of the first gap is equal to or more than the vehicle width w1, the controller 8 judges that the second other vehicle v2 may slip through the first gap.

In this way, by judging the possibility that the second other vehicle v2 slips through the first gap from behind the first other vehicle v1, it is possible to judge whether or not the second other vehicle v2 will interfere with the course of the host vehicle 20.

As a result, the host vehicle 20 can be advanced to the route p0 to travel through the intersection even when the first other vehicle v1 enters the intersection ahead on the route 21 where the host vehicle 20 is traveling from the route 22 different from the route 21 and there may be a following vehicle behind the first other vehicle v1.

Next, an example of a functional structure of the controller 8 will be described with reference to FIG. 3. The controller 8 includes an object recognition unit 30, a self-position estimation unit 31, a driving behavior determination unit 32, and a trajectory generation unit 33. Functions of the object recognition unit 30, the self-position estimation unit 31, the driving behavior determination unit 32, and the trajectory generation unit 33 may be implemented by, for example, allowing the processor 11 of the controller 8 to execute a computer program stored in the storage device 12.

The object recognition unit 30 recognizes objects around the host vehicle 20 on the basis of the ambient environment information output from the sensor unit 2. The objects recognized by the object recognition unit 30 may be, for example, the first other vehicle v1, a following vehicle behind the first other vehicle v1, an object around the first other vehicle v1, an object on the course of the first other vehicle v1 passing through an intersection, and a road edge (for example, a curb, a guardrail, a utility pole, or a road sign) of the travel lane of the first other vehicle v1.

For example, by using a known sensor fusion technology, the object recognition unit 30 integrates a result of recognition of an object detected by performing image processing on an image taken by the camera of the sensor unit 2 and a result of detection of the object obtained by a range finder such as a laser range-finder or a radar to recognize the object around the host vehicle 20.

In that case, the object recognition unit 30 tracks the recognized object. Specifically, the object recognition unit 30 performs identity verification (association) of the object recognized at different times, and predicts the behavior of the object on the basis of the association.

Note that the object recognition unit 30 may acquire information such as positions, sizes, and behavior of objects around the host vehicle 20 through vehicle-to-vehicle communication or road-to-vehicle communication.

The object recognition unit 30 outputs a result of the recognition to the driving behavior determination unit 32.

The self-position estimation unit 31 estimates the position and posture of the host vehicle 20 on the map from the current position of the host vehicle 20 obtained by the positioning unit 3 and the map data stored in the map database 4. The self-position estimation unit 31 identifies the road where the host vehicle 20 is traveling and, furthermore, the lane of the road where the host vehicle 20 is traveling.

The self-position estimation unit 31 outputs a result of the estimation to the driving behavior determination unit 32.

The driving behavior determination unit 32 judges whether or not a vehicle behind the first other vehicle v1 (for example, the second other vehicle v2, which is the following vehicle behind the first other vehicle v1) may slip past the first other vehicle v1 and hinder the advance of the host vehicle 20 on the basis of the result of the recognition by the object recognition unit 30, the result of the estimation by the self-position estimation unit 31, and the like.

The driving behavior determination unit 32 judges whether or not to advance the host vehicle 20 to the route p0 to travel through the intersection on the basis of whether or not a vehicle behind the first other vehicle v1 may hinder the advance of the host vehicle 20.

The driving behavior determination unit 32 includes an intersection information management unit 40, an other vehicle course prediction unit 41, an other vehicle/surrounding information management unit 42, a gap calculation unit 43, and a slip-through prediction unit 44.

The intersection information management unit 40 acquires host vehicle priority information 50 regarding the priority for the host vehicle 20 to travel on the route p0 to pass through the intersection on the basis of the travel route set by the navigation device 6, the map data stored in the map database 4, and the result of the recognition by the object recognition unit 30.

For example, when the host vehicle 20 turns right at the intersection on the basis of the travel route set by the navigation device 6, the intersection information management unit 40 judges that the priority to travel on the route p0 of the host vehicle 20 is lower than the priority to travel on the travel lane of the oncoming vehicle (i. e., the priority to travel straight through the intersection).

When the host vehicle 20 travels straight through the intersection or turns left thereat, the intersection information management unit 40 judges that the priority to travel on the route p0 of the host vehicle 20 is not lower than the priority to travel on the travel lane of the oncoming vehicle.

Additionally, the intersection information management unit 40 may judge whether or not it is specified that the host vehicle 20 should be temporarily stopped at the intersection ahead on the first route 21 of the host vehicle 20 on the basis of the map data stored in the map database 4. When it is specified that the host vehicle 20 should be temporarily stopped, the intersection information management unit 40 may judge that the priority to travel on the route p0 of the host vehicle 20 is lower than a priority to travel on a road intersecting with a travel road of the host vehicle 20.

Figure 6:
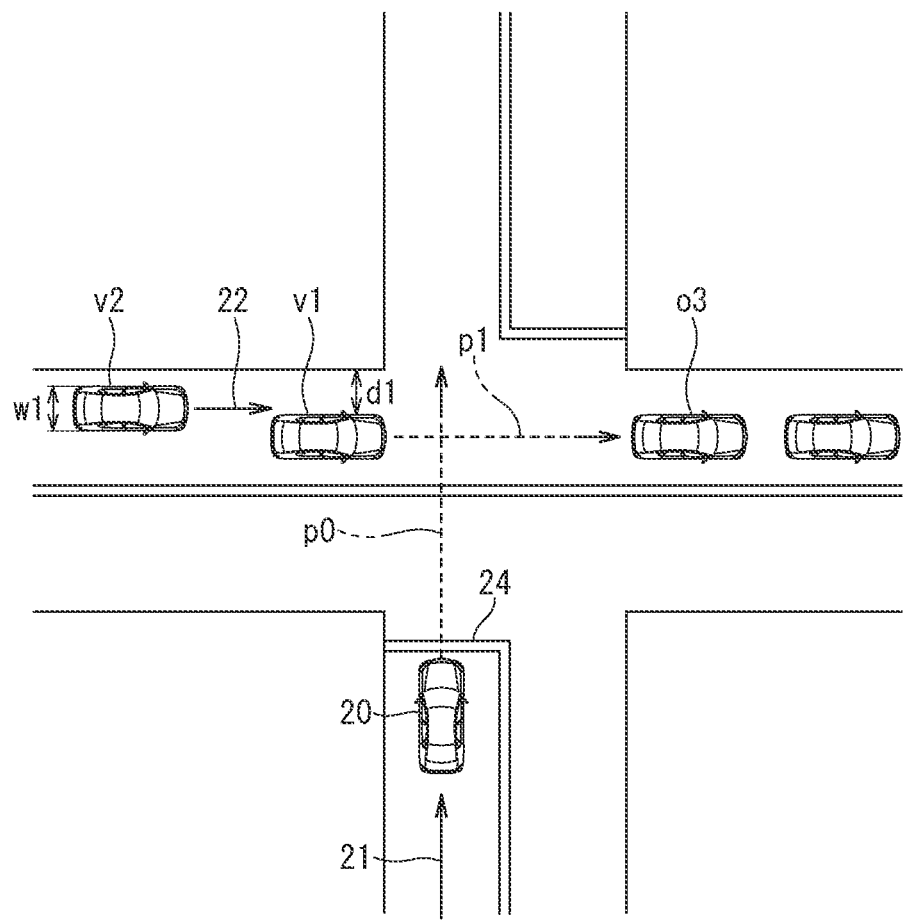
FIG. 6 is an illustrative diagram of a second example of the driving scene where the obstacle on the course of the other vehicle is a traffic jam ahead on the course of the other vehicle.
Figure 7:
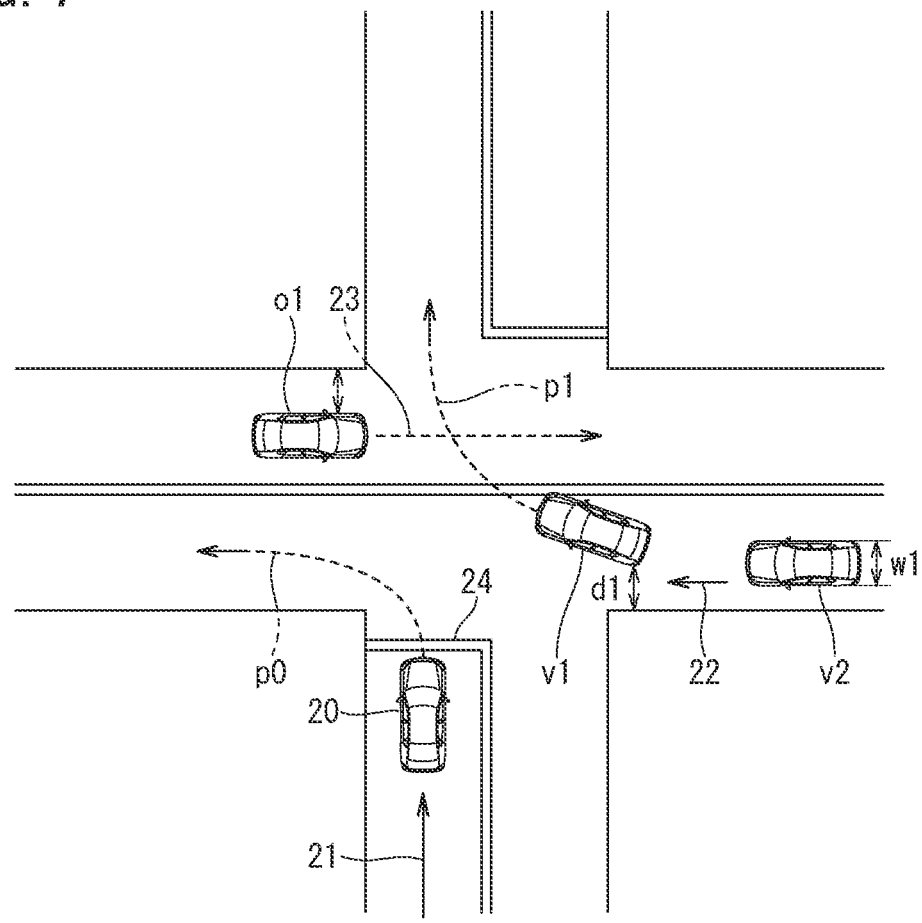
FIG. 7 is an illustrative diagram of an example of the driving scene where the obstacle on the course of the other vehicle is another vehicle that intersects with the course of the other vehicle.
Figure 9:
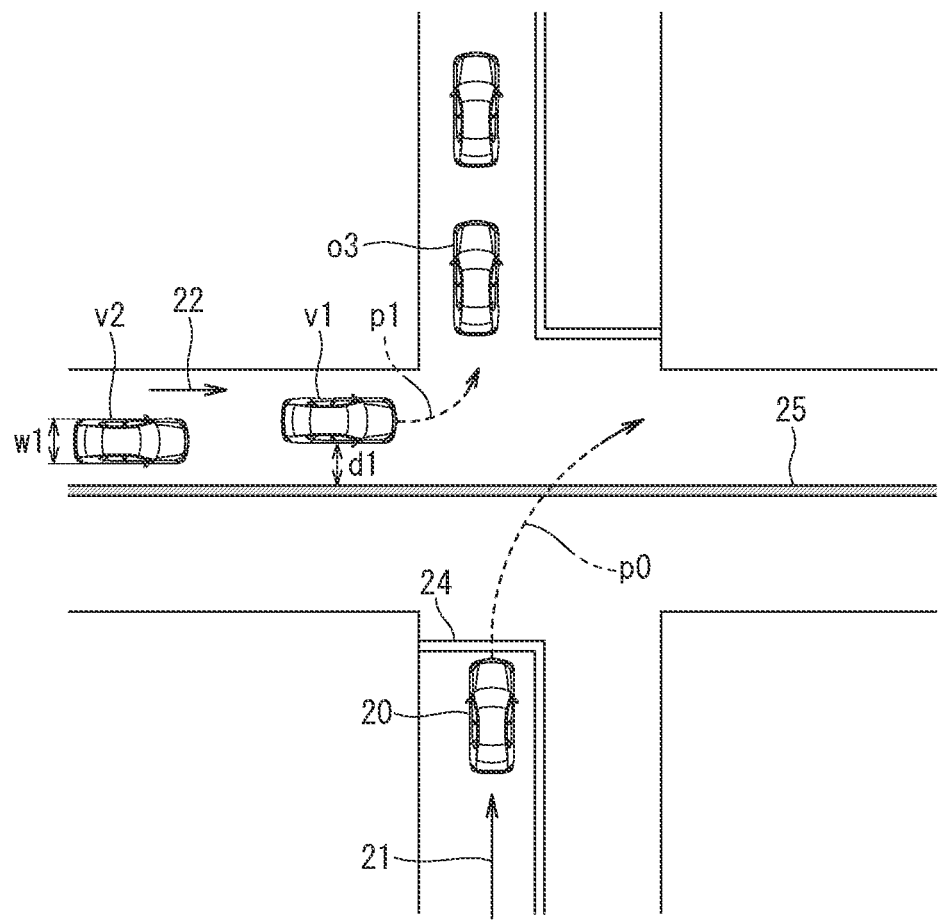
FIG. 9 is an illustrative diagram of an example of a road edge of a travel lane of the other vehicle.

In addition, when the intersection information management unit 40 detects a temporary stop sign or a temporary stop line 24 illustrated in FIGS. 6, 7, and 9 from the result of the recognition by the object recognition unit 30, the intersection information management unit 40 may judge that the priority to travel on the route p0 of the host vehicle 20 is lower than the priority to travel on the road intersecting with the travel road of the host vehicle 20. The intersection information management unit 40 outputs the host vehicle priority information 50 to the slip-through prediction unit 44.

Furthermore, the intersection information management unit 40 estimates a position of the road edge of the travel lane of the first other vehicle v1 on the map on the basis of the result of estimation of the self-position of the host vehicle 20, the map data stored in the map database 4, and the result of the recognition by the object recognition unit 30, and acquires road edge information 51 regarding the position and shape of the road edge. The intersection information management unit 40 may recognize, as the position of the road edge, a position of an object provided at the road edge, such as, for example, a curb, a guardrail, a utility pole, or a road sign.

The intersection information management unit 40 outputs the road edge information 51 to the gap calculation unit 43.

The other vehicle/surrounding information management unit 42 estimates a position of an object around the host vehicle 20 on the map on the basis of the result of estimation of the self-position and the result of the recognition by the object recognition unit 30, and acquires surrounding object information 54 regarding the position of the object around the host vehicle 20. The surrounding object information 54 may include positional information of each point on a surface of the object around the host vehicle 20.

Additionally, the other vehicle/surrounding information management unit 42 estimates positions of other vehicles (for example, the first other vehicle v1 and the second other vehicle v2) around the host vehicle 20 on the map on the basis of the result of estimation of the self-position and the result of the recognition by the object recognition unit 30, and acquires other vehicle end information 55 regarding each point on surfaces of vehicle bodies of the other vehicles.

The other vehicle course prediction unit 41 judges whether or not the first other vehicle v1 will stop on the basis of the result of estimation of the self-position and the result of the recognition by the object recognition unit 30, and predicts the stop position of the first other vehicle v1. The other vehicle course prediction unit 41 includes a course prediction unit 52 and a stop prediction unit 53.

The other vehicle course prediction unit 41 predicts the course p1 of the first other vehicle v1 on the map on the basis of the result of estimation of the self-position and the result of the recognition by the object recognition unit 30. For example, the other vehicle course prediction unit 41 may predict the course p1 of the first other vehicle v1 on the basis of a movement history of the first other vehicle v1 predicted by the object recognition unit 30, a positional relationship between an object around the first other vehicle v1 recognized by the object recognition unit 30 and the first other vehicle v1, and the like.

The stop prediction unit 53 judges whether or not the predicted course p1 of the first other vehicle v1 will obstruct the course of the host vehicle 20.

For example, in a driving scene of FIG. 2, the future planned route p0 where the host vehicle 20 travels at the intersection is the right turn, and the course p1 of the first other vehicle v1 is also the right turn. Accordingly, the first other vehicle v1 does not obstruct the course of the host vehicle 20.

When the course p1 of the first other vehicle v1 does not obstruct the course of the host vehicle 20, the stop prediction unit 53 acquires information of an object present ahead on the course p1 where the first other vehicle v1 passes through the intersection from the surrounding object information 54 acquired by the other vehicle/surrounding information management unit 42 on the basis of the course p1 of the first other vehicle v1 predicted by the other vehicle course prediction unit 41.

The stop prediction unit 53 judges the state of a point ahead on the course p1 where the first other vehicle v1 passes through the intersection on the basis of the information acquired from the surrounding object information 54. The stop prediction unit 53 judges whether or not the first other vehicle v1 will stop and the stop position of the first other vehicle v1 on the basis of the state of the point ahead on the course p1.

When there is an obstacle (an object) on the course p1 of the first other vehicle v1, the stop prediction unit 53 may predict the stop position of the first other vehicle v1, for example, from the surrounding object information 54.

For example, as illustrated in FIG. 2, the obstacle on the course p1 of the first other vehicle v1 may be another vehicle o1 traveling on a course 23 intersecting with the course p1 where the first other vehicle v1 turns right.

Figure 4:
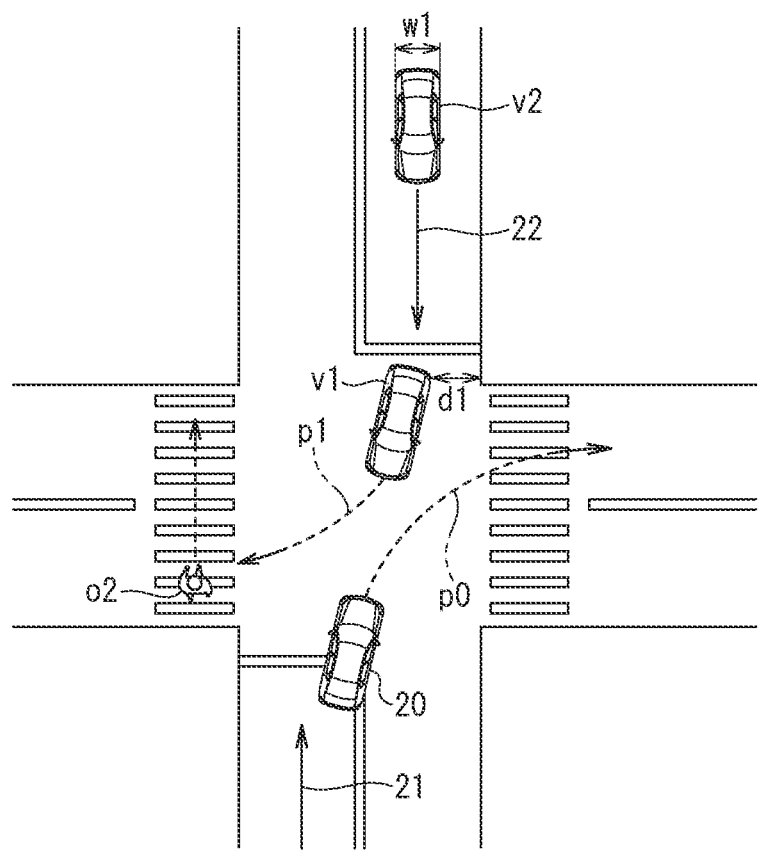
FIG. 4 is an illustrative diagram of an example of a driving scene where an obstacle on the course of another vehicle is a pedestrian.

For example, as illustrated in FIG. 4, the obstacle on the course p1 of the first other vehicle v1 may be a pedestrian o2 on the course p1 of the first other vehicle v1.

The obstacle on the course p1 of the first other vehicle v1 may be a preceding vehicle ahead of the first other vehicle v1 or a traffic jam ahead on the course p1 of the first other vehicle v1.

Figure 5:
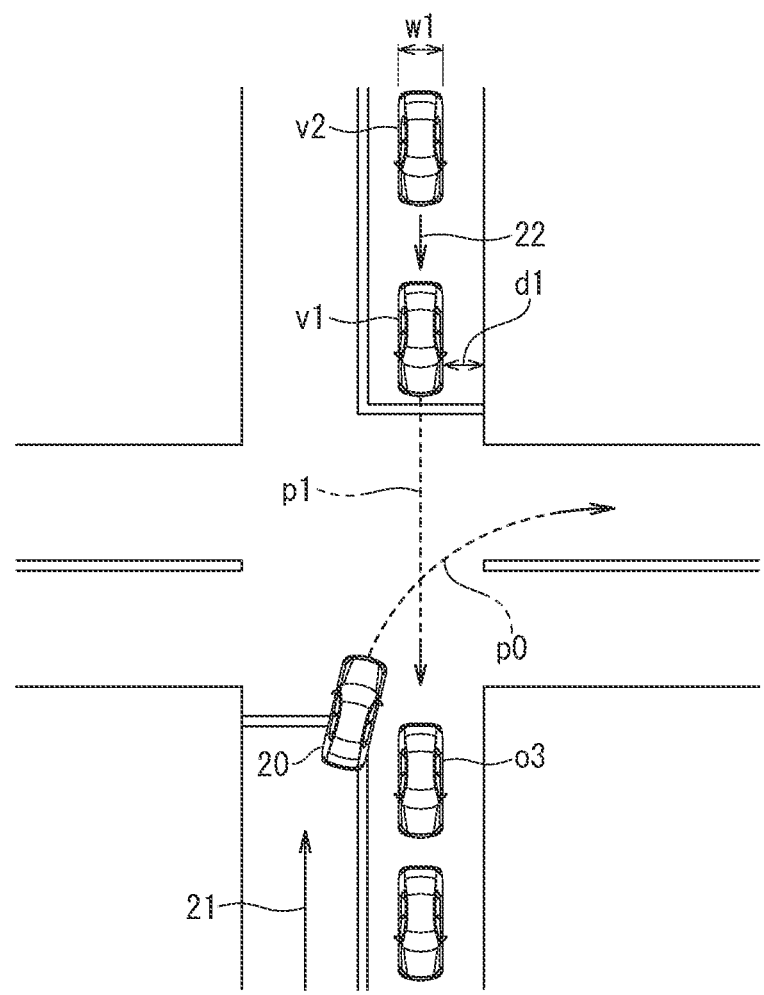
FIG. 5 is an illustrative diagram of a first example of a driving scene where the obstacle on the course of the other vehicle is a traffic jam ahead on the course of the other vehicle.

For example, in a driving scene of FIG. 5, there is a traffic jam ahead on the course p1 of the first other vehicle v1, and there is a stopped preceding vehicle o3. Therefore, the stop prediction unit 53 predicts that the first other vehicle v1 will stop at a position before the intersection. Even in this case, the first other vehicle v1 does not obstruct the route p0 of the host vehicle 20 that turns right.

In a driving scene of FIG. 6, the first route 21 where the host vehicle 20 is traveling and the second route 22 where the first other vehicle v1 is traveling intersect at an intersection. There is a traffic jam ahead on the course p1 of the first other vehicle v1, and the preceding vehicle o3 is stopped, so that the first other vehicle v1 needs to stop before the intersection. Therefore, the first other vehicle v1 does not obstruct the course of the host vehicle 20 that travels straight ahead. Even in this case, the stop prediction unit 53 judges that the preceding vehicle ahead of the first other vehicle v1 and the traffic jam ahead on the course p1 of the first other vehicle v1 are obstacles on the course p1 of the first other vehicle v1, and predicts the position before the intersection as the stop position of the first other vehicle v1.

Even in a driving scene of FIG. 7, the first route 21 where the host vehicle 20 is traveling and the second route 22 where the first other vehicle v1 is traveling intersect at an intersection. The future planned route p0 where the host vehicle 20 travels at the intersection is a left turn, and the course p1 of the first other vehicle v1 is a right turn. Accordingly, the first other vehicle v1 does not obstruct the course of the host vehicle 20.

The course p1 where the first other vehicle v1 turns right at the intersection intersects with the course 23 where the oncoming vehicle o1 of the first other vehicle v1 travels straight through the intersection. Therefore, the stop prediction unit 53 judges that the oncoming vehicle o1 is an obstacle on the course p1 of the first other vehicle v1, and predicts that a position where the first other vehicle v1 waits in the intersection until the oncoming vehicle o1 passes therethrough is the stop position of the first other vehicle v1.

The intersection where the driving behavior determination unit 32 judges whether or not to advance the host vehicle 20 is not limited to a crossroad. In a driving scene of FIG. 8, the driving behavior determination unit 32 judges whether or not to advance the host vehicle 20 in a T-junction where the first route 21 where the host vehicle 20 is traveling and the second route 22 where the first other vehicle v1 is traveling intersect.

The first other vehicle v1 is approaching from a right side of the host vehicle 20 and is about to enter by a left turn into the road where the host vehicle 20 is traveling, and the host vehicle 20 is about to advance by a left turn into a direction opposite to a direction in which the first other vehicle v1 is coming. Even in this case, the first other vehicle v1 does not obstruct the route p0 of the host vehicle 20 that turns left.

When the width of the road where the host vehicle 20 is traveling (i.e., the road into which the first other vehicle v1 is planned to enter) is narrow and it is therefore difficult for the host vehicle 20 and the first other vehicle v1 to pass each other, the first other vehicle v1 cannot enter the road where the host vehicle 20 is traveling. Thus, the stop prediction unit 53 judges that the host vehicle 20 is an obstacle on the course p1 of the first other vehicle v1, and predicts that a position before the T-junction is the stop position of the first other vehicle v1.

Figure 3:
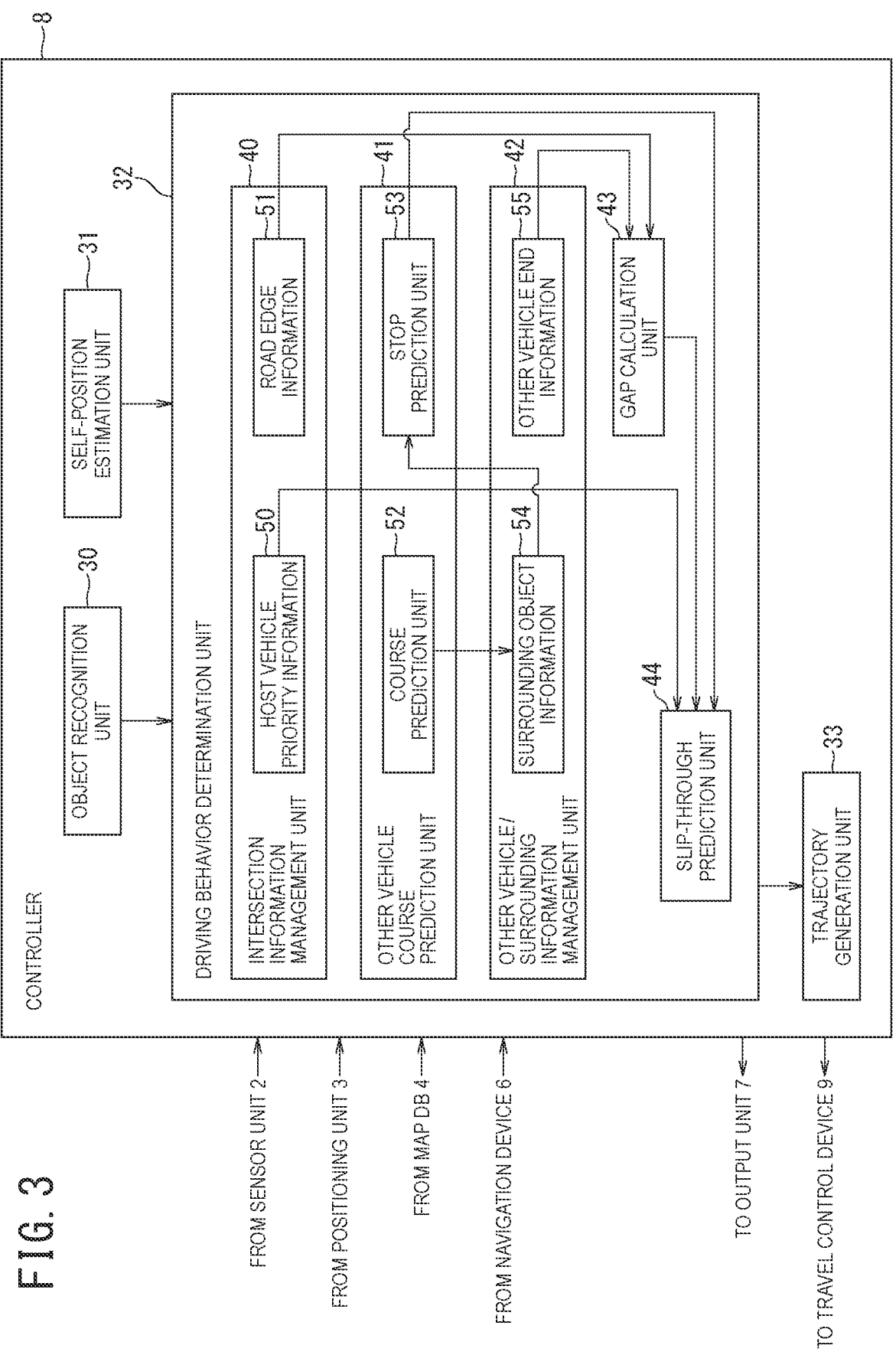
FIG. 3 is a block diagram illustrating an example of the functional structure of a controller illustrated in FIG. 1.

Reference will be made to FIG. 3. The gap calculation unit 43 calculates the minimum distance d1 of the first gap, which is a candidate for the gap where the second other vehicle v2 is considered to slip past the stopped first other vehicle v1, on the basis of the road edge information acquired by the intersection information management unit 40 and the other vehicle end information 55 acquired by the other vehicle/surrounding information management unit 42.

For example, in the driving scenes of FIG. 2 and FIGS. 4 to 7 (i. e., the driving scene where the first other vehicle v1 turns right or travels straight ahead), the gap calculation unit 43 may calculate, as the minimum distance d1, a minimum distance of a gap between an end portion of the vehicle body of the first other vehicle v1 and a road edge on a left side of the travel lane of the first other vehicle v1.

Figure 8:
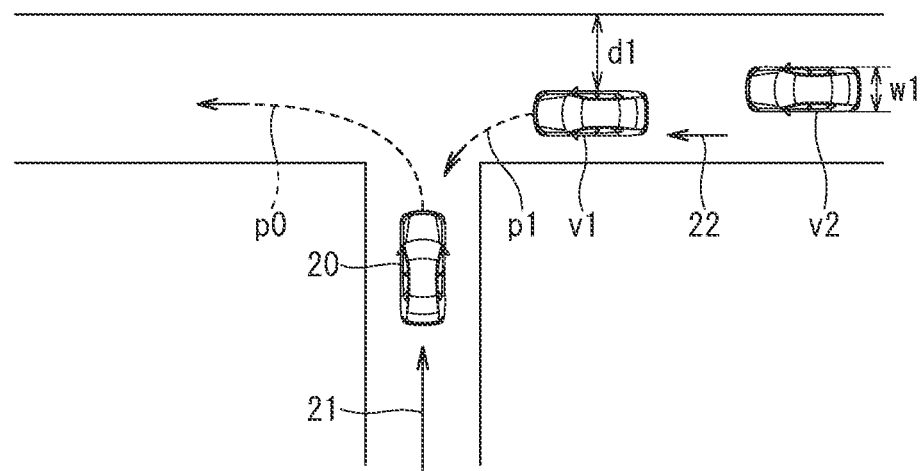
FIG. 8 is an illustrative diagram of an example of the driving assistance method in a T-junction.

Additionally, for example, in the driving scene of FIG. 8 (i. e., the driving scene where the first other vehicle v1 turns left), the gap calculation unit 43 may calculate, as the minimum distance d1, a minimum distance of a gap between an end portion of the vehicle body of the first other vehicle v1 and a road edge on a right side of the travel lane of the first other vehicle v1.

Furthermore, in a driving scene illustrated in FIG. 9 where the first other vehicle v1 turns left, a traffic lane line (a yellow line in Japan) 25 prohibiting lane changes is provided between the travel lane of the first other vehicle v1 and an oncoming lane. In such a case, the second other vehicle v2 is considered unlikely to cross the traffic lane line 25 and slip past the first other vehicle v1.

Therefore, the gap calculation unit 43 may consider the traffic lane line 25 as a road edge and calculate, as the minimum distance d1, a minimum distance of a gap between an end portion of the vehicle body of the first other vehicle v1 and the traffic lane line 25 on the right side of the travel lane of the first other vehicle v1.

The gap calculation unit 43 may detect, as the minimum distance d1 of the first gap, a minimum distance of a gap between the vehicle body of the first other vehicle v1 and a surrounding object around the first other vehicle v1.

Figure 10:
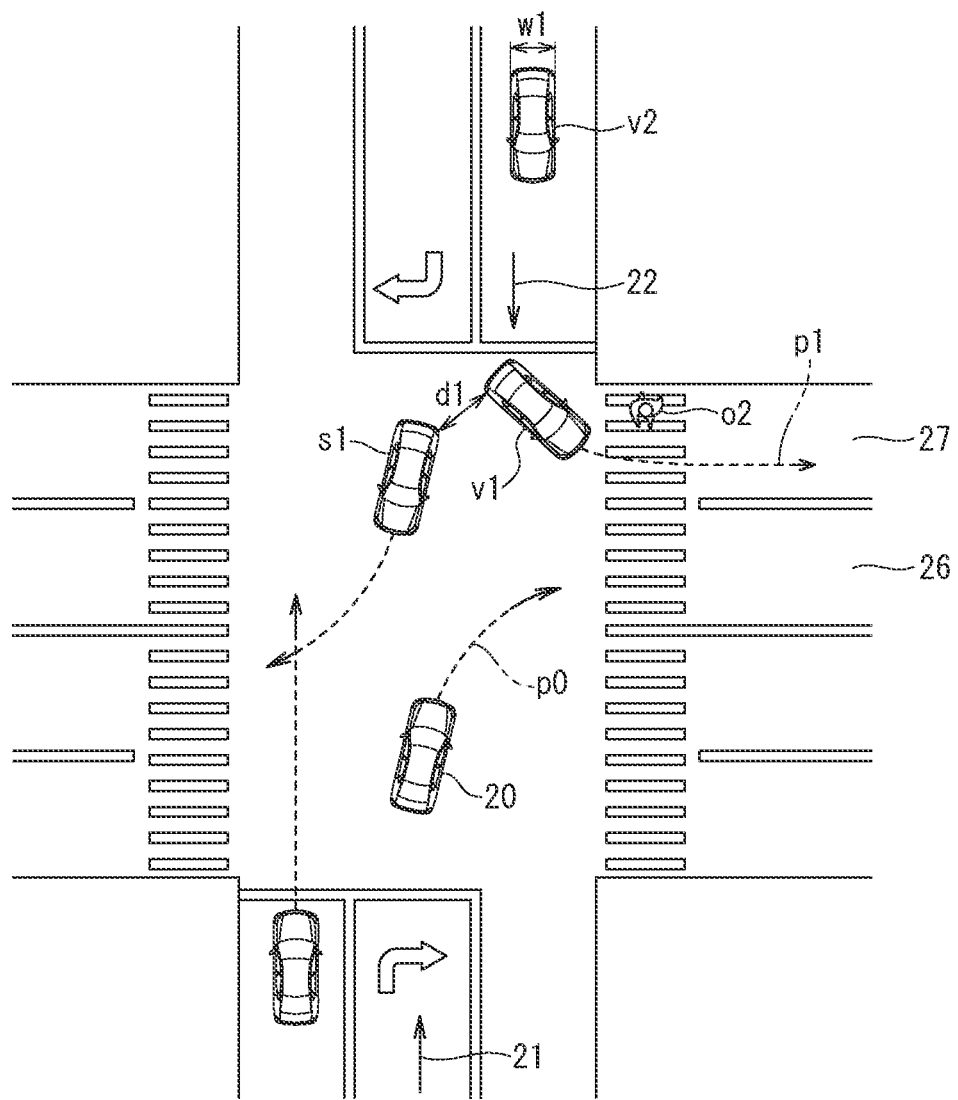
FIG. 10 is an illustrative diagram of another example of a gap through which a following vehicle may slip.

In a driving scene of FIG. 10, the host vehicle 20 traveling on the planned route p0 attempts to turn right at an intersection and enter a lane 26, and the first other vehicle v1 traveling on the oncoming lane is predicted to proceed on the course p1, turn left at the intersection, and enter a lane 27 adjacent to the lane 26. Additionally, there is an obstacle (the pedestrian o2) on the course p1 of the first other vehicle v1, so that the first other vehicle v1 is predicted to stop before the crosswalk.

[On the other hand, in the intersection, there is another vehicle s1 around the first other vehicle v1 (on the right side of the first other vehicle v1). A course where the other vehicle s1 turns right at the intersection intersects with a course where a following vehicle behind the host vehicle 20 travels straight through the intersection, and the following vehicle behind the host vehicle 20 is an obstacle on the course of the other vehicle s1. Therefore, the other vehicle s1 cannot proceed and is stopped in the intersection.

In this case, the second other vehicle v2 may slip through a gap between the first other vehicle v1 and the other vehicle s1.

Thus, the gap calculation unit 43 may detect, as the minimum distance d1 of the first gap, a minimum distance of the gap between the vehicle body of the first other vehicle v1 and the other vehicle s1.

Detecting the minimum distance of the gap between the vehicle body of the first other vehicle v1 and the other vehicle s1 is not limited to the case where the other vehicle s1 is stopped. The gap calculation unit 43 may detect, as the minimum distance d1, a minimum distance of a gap between the vehicle body of the first other vehicle v1 and the other vehicle s1 even when the other vehicle s1 is decelerating due to an obstacle on the course of the other vehicle s1.

The obstacle on the course of the other vehicle s1 may be, for example, a preceding vehicle ahead of the other vehicle s1, a traffic jam ahead on the course of the other vehicle s1, another vehicle traveling on a course intersecting with the course of the other vehicle s1, or a pedestrian on the course of the other vehicle s1.

Figure 11A:
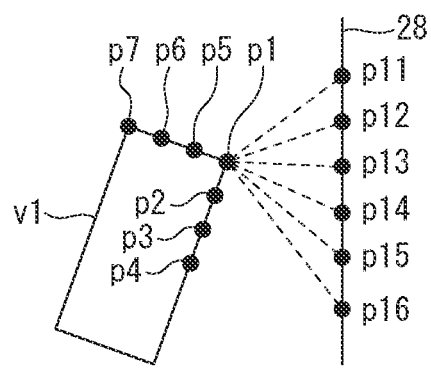
FIG. 11A is an illustrative diagram (1) of a minimum distance of a gap between a vehicle body of the other vehicle and a road edge.

Next, a description will be given of a method for calculating the minimum distance d1 of a gap between an end portion of the vehicle body of the first other vehicle v1 and a road edge of the travel lane of the first other vehicle v1. Reference will be made to FIG. 11A. First, the gap calculation unit 43 selects a point p1 from a plurality of points p1 to p7 on an outer peripheral surface of the vehicle body of the first other vehicle v1 included in the information detected by the object recognition unit 30. The gap calculation unit 43 determines each combination of the selected point p1 and a plurality of points p11 to p16 on a road edge 28, and calculates each distance between the points in the determined combinations.

Figure 11B:
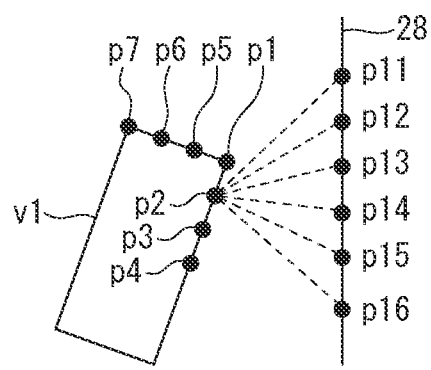
FIG. 11B is an illustrative diagram (2) of a minimum distance of the gap between the vehicle body of the other vehicle and the road edge.

Reference will be made to FIG. 11B. Next, the gap calculation unit 43 selects a point p2 from the plurality of points p1 to p7. The gap calculation unit 43 determines each combination of the selected point p2 and the plurality of points p11 to p16, and calculates each distance between the points in the determined combinations.

Hereinafter, similarly, the gap calculation unit 43 also determines each combination of the plurality of points p3 to p7 on the outer periphery of the vehicle body of the first other vehicle v1 and the plurality of points p11 to p16 on the road edge 28, and calculates each distance between the points in the combinations.

The gap calculation unit 43 selects a smallest distance among the calculated distances as the minimum distance d1 of the first gap.

Figure 11C:
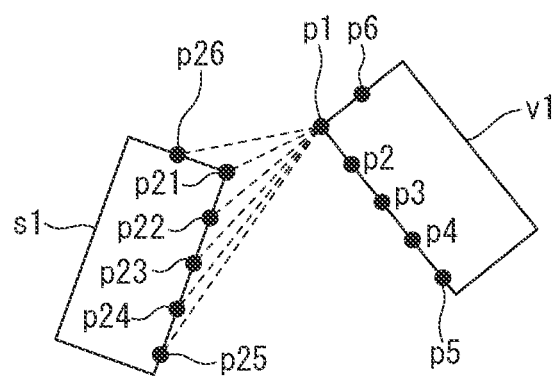
FIG. 11C is an illustrative diagram (1) of a minimum distance of a gap between the vehicle body of the other vehicle and a surrounding object.

Next, a description will be given of a method for calculating the minimum distance d1 of a gap between an end portion of the vehicle body of the first other vehicle v1 and a surrounding object s1 around the first other vehicle v1. Reference will be made to FIG. 11C. First, the gap calculation unit 43 selects a point p1 from a plurality of points p1 to p6 on the outer peripheral surface of the vehicle body of the first other vehicle v1 included in the information detected by the object recognition unit 30. The gap calculation unit 43 determines each combination of the selected point p1 and a plurality of points p21 to p26 on the surrounding object s1, and calculates each distance between the points in the determined combinations.

Figure 11D:
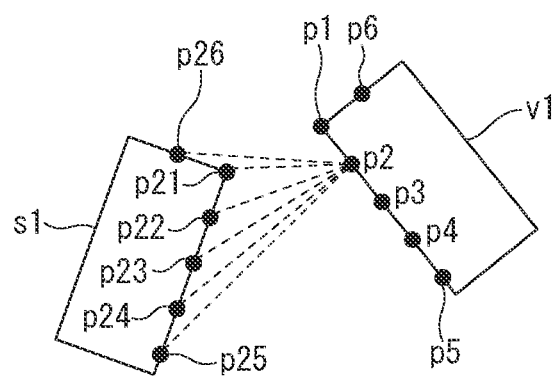
FIG. 11D is an illustrative diagram (2) of a minimum distance of the gap between the vehicle body of the other vehicle and the surrounding object.

Reference will be made to FIG. 11D. Next, the gap calculation unit 43 selects a point p2 from the plurality of points p1 to p6. The gap calculation unit 43 determines each combination of the selected point p2 and the plurality of points p21 to p26, and calculates each distance between the points in the determined combinations.

Hereinafter, similarly, the gap calculation unit 43 also determines each combination of the plurality of points p3 to p6 on the outer periphery of the vehicle body of the first other vehicle v1 and the plurality of points p21 to p26 on the surrounding object s1, and calculates each distance between the points in the combinations.

The gap calculation unit 43 selects a smallest distance among the calculated distances as the minimum distance d1 of the first gap.

Reference will be made to FIG. 3. The gap calculation unit 43 outputs the calculated minimum distance d1 to the slip-through prediction unit 44. The slip-through prediction unit 44 predicts whether or not the second other vehicle v2 may slip through the first gap from behind the first other vehicle v1 on the basis of the host vehicle priority information 50, the result of the prediction by the stop prediction unit 53, and the minimum distance d1 of the first gap calculated by the gap calculation unit 43.

The slip-through prediction unit 44 judges whether or not the priority for the host vehicle to travel on the route p0 to pass through the intersection is higher than the priority to travel on the travel lane of the first other vehicle v1 (i. e., the travel lane of the second other vehicle v2, which is the following vehicle behind the first other vehicle v1) on the basis of the host vehicle priority information 50.

When the priority for the host vehicle 20 to travel on the route p0 to pass through the intersection is higher than the priority to travel on the travel lane of the first other vehicle v1, the host vehicle 20 can travel through the intersection with priority over the second other vehicle v2. Accordingly, in this case, the slip-through prediction unit 44 does not predict whether or not the second other vehicle v2 may slip through the first gap.

On the other hand, when the priority for the host vehicle 20 to travel on the route p0 to pass through the intersection is not higher than the priority to travel on the travel lane of the first other vehicle v1 (i. e., when the priority for the host vehicle 20 to travel on the route p0 to pass through the intersection is equal to or less than the priority to travel on the travel lane of the first other vehicle v1), the slip-through prediction unit 44 predicts whether or not the second other vehicle v2 may slip through the first gap.

Next, the slip-through prediction unit 44 judges whether or not the minimum distance d1 of the first gap calculated by the gap calculation unit 43 is equal to or less than a predetermined threshold value. The threshold value is set smaller than, for example, a width that allows a motorcycle to pass through the gap.

When the minimum distance d1 of the first gap is equal to or less than the predetermined threshold value, the slip-through prediction unit 44 predicts that there is no possibility for the second other vehicle v2 to slip through the first gap. When it is predicted that there is no possibility for the second other vehicle v2 to slip through the first gap, the slip-through prediction unit 44 predicts that there is no possibility for a vehicle behind the first other vehicle v1 to slip past the first other vehicle v1.

When the minimum distance d1 of the first gap is larger than the predetermined threshold value, the slip-through prediction unit 44 judges whether or not the object recognition unit 30 has been able to detect the second other vehicle v2 on the basis of the surrounding object information 54.

When the object recognition unit 30 cannot detect the second other vehicle v2, the slip-through prediction unit 44 predicts that a vehicle behind the first other vehicle v1 may slip past the first other vehicle v1. This is because the second other vehicle v2 may be in a blind spot of the first other vehicle v1 or a surrounding object around the first other vehicle v1.

On the other hand, when the object recognition unit 30 detects the second other vehicle v2, the slip-through prediction unit 44 measures a vehicle width w1 of the second other vehicle v2.

For example, the slip-through prediction unit 44 may measure the vehicle width w1 of the second other vehicle v2 on the basis of information on a size of the second other vehicle v2 recognized by the object recognition unit 30. The vehicle width w1 may be calculated by adding a predetermined margin to a width of the second other vehicle v2 measured on the basis of the information recognized by the object recognition unit 30.

Additionally, for example, the slip-through prediction unit 44 may identify the type of the second other vehicle v2 by pattern matching using an image of the whole or a part of the vehicle body of the second other vehicle v2. In this case, for example, the slip-through prediction unit 44 can acquire vehicle width information of the identified vehicle type by collating vehicle data stored in advance including vehicle width information for each vehicle type or vehicle data that can be acquired by the communication unit 5 with the identified vehicle type.

The slip-through prediction unit 44 judges whether or not the vehicle width w1 of the second other vehicle v2 is shorter than the minimum distance d1 of the first gap. When the vehicle width w1 of the second other vehicle v2 is longer than the minimum distance d1 of the first gap, the slip-through prediction unit 44 predicts that there is no possibility for the second other vehicle v2 to slip through the first gap. When it is predicted that there is no possibility for the second other vehicle v2 to slip through the first gap, the slip-through prediction unit 44 predicts that there is no possibility for the vehicle behind the first other vehicle v1 to slip past the first other vehicle v1.

On the other hand, when the vehicle width w1 of the second other vehicle v2 is equal to or shorter than the minimum distance d1 of the first gap, the slip-through prediction unit 44 judges whether or not the second other vehicle v2 will stop. When the vehicle width w1 of the second other vehicle v2 is equal to or shorter than the minimum distance d1 of the first gap and the second other vehicle v2 does not stop, the slip-through prediction unit 44 predicts that the second other vehicle v2 may slip through the first gap.

When it is predicted that the second other vehicle v2 may slip through the first gap, the slip-through prediction unit 44 predicts that the vehicle behind the first other vehicle v1 may slip past the first other vehicle v1.

Figure 12:
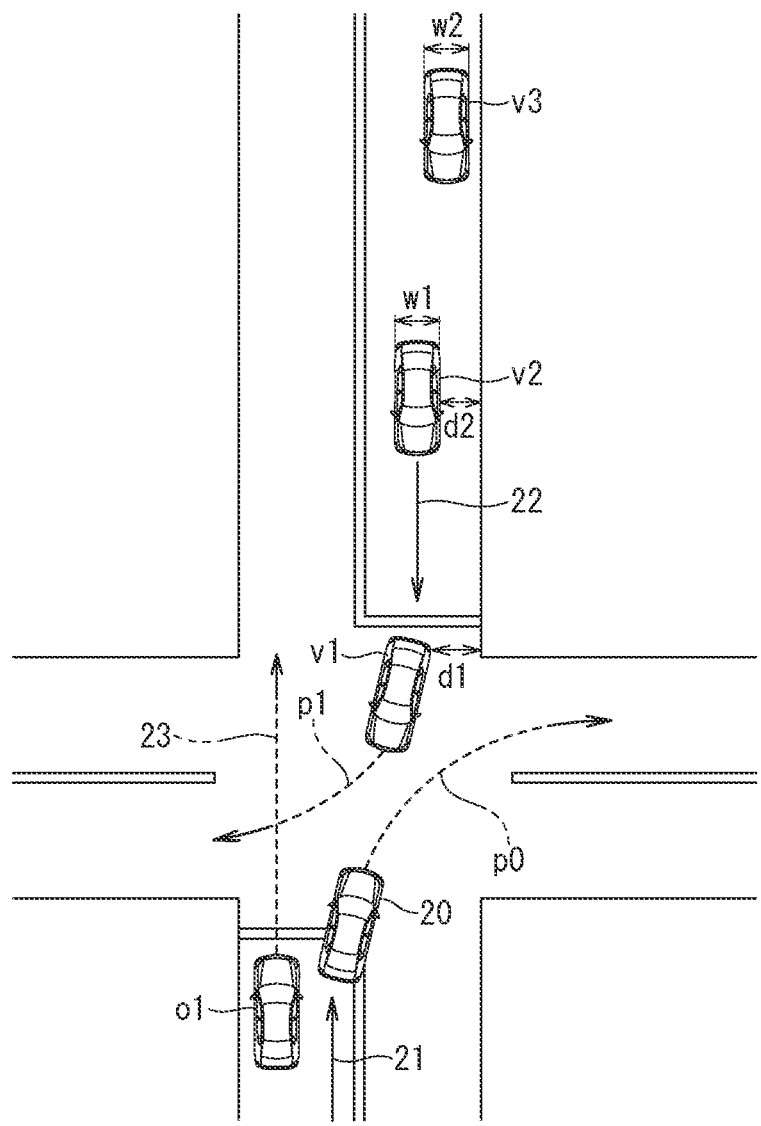
FIG. 12 is an illustrative diagram of an example of the driving assistance method when considering another following vehicle that is behind the following vehicle of the other vehicle.

Next, as illustrated in FIG. 12, the slip-through prediction unit 44 calculates a minimum distance d2 of a gap (hereinafter referred to as "second gap") between the vehicle body of the second other vehicle v2 and a road edge of the travel lane of the second other vehicle v2 (or between the vehicle body of the second other vehicle v2 and a surrounding object around the second other vehicle v2). The method for calculating the minimum distance d2 of the second gap is the same as the method for calculating the minimum distance d1 of the first gap described with reference to FIGS. 11A to 11D. When a part of the vehicle body of the second other vehicle v2 is hidden by the first other vehicle v1 or a surrounding object around the first other vehicle v1, a vehicle model (a virtual object substantially equal in size in front-back and left-right directions to the specified vehicle type) of the vehicle type identified by the pattern matching of the image of the second other vehicle v2 may be virtually arranged in the map data to calculate a gap between the vehicle model and the road edge or the surrounding object.

When the minimum distance d2 of the second gap is equal to or shorter than a predetermined threshold value smaller than, for example, a widthwise size of a motorcycle, the slip-through prediction unit 44 predicts that there is no possibility for a third other vehicle v3, which is a following vehicle behind the second other vehicle v2, to slip through the second gap. When it is predicted that there is no possibility for the third other vehicle v3 to slip through the second gap, the slip-through prediction unit 44 predicts that there is no possibility of the vehicle behind the first other vehicle v1 to slip past the first other vehicle v1.

When the minimum distance d2 of the second gap is larger than the predetermined threshold value, the slip-through prediction unit 44 judges whether or not the object recognition unit 30 has been able to detect the third other vehicle v3. When the object recognition unit 30 cannot detect the third other vehicle v3, the slip-through prediction unit 44 predicts that the third other vehicle v3 may slip through the first gap and the second gap. When the third other vehicle v3 may slip through the first gap and the second gap, the slip-through prediction unit 44 predicts that the vehicle behind the first other vehicle v1 may slip past the first other vehicle v1.

When the object recognition unit 30 detects the third other vehicle v3, the slip-through prediction unit 44 measures a vehicle width w2 of the third other vehicle v3. The method for measuring the vehicle width w2 may be the same as the method for measuring the vehicle width w1 of the second other vehicle v2.

The slip-through prediction unit 44 selects a smaller one of the minimum distance d1 of the first gap and the minimum distance d2 of the second gap as a minimum distance of interest D.

The slip-through prediction unit 44 judges whether or not the vehicle width w2 of the third other vehicle v3 is shorter than the minimum distance of interest D. When the vehicle width w2 of the third other vehicle v3 is longer than the minimum distance of interest D, the slip-through prediction unit 44 predicts that there is no possibility for the third other vehicle v3 to slip through the first gap and the second gap. When it is predicted that there is no possibility for the third other vehicle v3 to slip through the first gap and the second gap, the slip-through prediction unit 44 predicts that there is no possibility for the vehicle behind the first other vehicle v1 to slip past the first other vehicle v1.

On the other hand, when the vehicle width w2 of the third other vehicle v3 is equal to or shorter than the minimum distance of interest D, the slip-through prediction unit 44 judges whether or not the third other vehicle v3 is stopped. When the vehicle width w2 of the third other vehicle v3 is equal to or shorter than the minimum distance of interest D and the third other vehicle v3 is not stopped, the slip-through prediction unit 44 predicts that the third other vehicle v3 may slip through the first gap and the second gap. When it is predicted that the third other vehicle v3 may slip through the first gap and the second gap, the slip-through prediction unit 44 predicts that the vehicle behind the first other vehicle v1 may slip past the first other vehicle v1.

Hereinafter, similarly, the slip-through prediction unit 44 repeats the same processing regarding each vehicle behind the third other vehicle v3 until it is predicted that a vehicle behind the first other vehicle v1 may slip past the first other vehicle v1 or it is predicted that there is no such possibility.

When it is predicted that a vehicle behind the first other vehicle v1 may slip past the first other vehicle v1, the slip-through prediction unit 44 determines to stop the host vehicle 20 before advancing the host vehicle 20 to the route p0 to travel through the intersection.

When it is predicted that there is no possibility for a vehicle behind the first other vehicle v1 to slip past the first other vehicle v1, the slip-through prediction unit 44 determines to advance the host vehicle 20 to the route p0 to travel through the intersection.

Reference will be made to FIG. 3. The slip-through prediction unit 44 outputs a result of decision to the trajectory generation unit 33.

The trajectory generation unit 33 generates a travel trajectory for causing the host vehicle to travel on the basis of the ambient environment information output from the sensor unit 2, the travel route set by the navigation device 6, and the map data stored in the map database 4.

The trajectory generation unit 33 generates the travel trajectory in such a manner as to include a speed profile for stopping the host vehicle at a stop position or decelerate and pass the stop position.

When the slip-through prediction unit 44 determines to stop the host vehicle 20 before advancing the host vehicle to the route p0 to travel through the intersection, the travel trajectory generation unit 33 generates a travel trajectory for stopping the host vehicle 20 at a position for waiting for a vehicle behind the first other vehicle v1 to slip past and overtake the first other vehicle v1 before advancing the host vehicle 20 to the route p0 to travel through the intersection.

The travel control device 9 controls the actuator 10 on the basis of the travel trajectory generated by the trajectory generation unit 33 to stop the host vehicle 20 at the position for waiting for a vehicle behind the first other vehicle v1 to slip past and overtake the first other vehicle v1.

When the slip-through prediction unit 44 determines to advance the host vehicle 20 to the route p0 to travel through the intersection, the trajectory generation unit 33 generates a travel trajectory for advancing the host vehicle 20 to the route p0 to travel through the intersection.

The travel control device 9 controls the actuator 10 on the basis of the travel trajectory generated by the trajectory generation unit 33 to advance the host vehicle 20 to the route p0 to travel through the intersection.

Note that instead of autonomously driving the host vehicle 20 by the travel control device 9, the slip-through prediction unit 44 may output guidance information for prompting driving of the host vehicle 20 from the output unit 7 to assist driving operation of the driver.

For example, when it is predicted that a vehicle behind the first other vehicle v1 may slip past and overtake the first other vehicle v1, the slip-through prediction unit 44 may output guidance information for notifying that a vehicle behind the first other vehicle v1 may overtake the first other vehicle v1 and interfere with the host vehicle and prompting to stop the host vehicle 20 before advancing the host vehicle 20 to the route p0 to travel through the intersection from the output unit 7.

For example, when it is predicted that there is no possibility for a vehicle behind the first other vehicle v1 to slip past and overtake the first other vehicle v1, the slip-through prediction unit 44 may output guidance information for notifying that there is no possibility for a vehicle behind the first other vehicle v1 to slip past and overtake the first other vehicle v1 and prompting to advance the host vehicle 20 to the route p0 to travel through the intersection from the output unit 7.

(Driving Assistance Method)

Next, an example of a driving assistance method according to an embodiment will be described with reference to flowcharts of FIGS. 13A and 13B.

At step S1, the driving behavior determination unit 32 acquires object information regarding to the position of an object around the host vehicle 20 on the basis of the result of the recognition by the object recognition unit 30, and also acquires map information on the basis of the result of estimation of the self-position and the map database 4.

At step S2, the driving behavior determination unit 32 judges whether or not the host vehicle is approaching an intersection. When the host vehicle is approaching the intersection (step S2: Y), processing proceeds to step S3. When the host vehicle is not approaching the intersection (step S2: N), processing returns to step S1.

At step S3, the slip-through prediction unit 44 judges whether or not the priority for the host vehicle 20 to travel on the route p0 to pass through the intersection is higher than the priority to travel on the travel lane of the first other vehicle v1.

When the priority for the host vehicle 20 to travel on the route p0 to pass through the intersection is higher than the priority to travel on the travel lane of the first other vehicle v1 (step S3: Y), processing proceeds to step S14 of FIG. 13B. In this case, the slip-through prediction unit 44 determines to advance the host vehicle 20 to the route p0 to travel through the intersection. As a result, the travel control device 9 advances the host vehicle 20 to the route p0 to travel through the intersection.

When the priority for the host vehicle 20 to travel on the route p0 to pass through the intersection is not higher than the route to travel on the travel lane of the first other vehicle v1 (step S3: N), processing proceeds to step S4.

At step S4, the slip-through prediction unit 44 judges whether or not the first other vehicle v1 approaching the intersection has been detected. When the first other vehicle v1 approaching the intersection is detected (step S4: Y), processing proceeds to step S5.

When the first other vehicle v1 approaching the intersection is not detected (step S4: N), processing proceeds to step S14 of FIG. 13B. In this case, the travel control device 9 advances the host vehicle 20 to the route p0 to travel through the intersection.

At step S5, the stop prediction unit 53 judges whether or not the course p1 of the first other vehicle v1 will obstruct the course of the host vehicle 20. When the course p1 of the first other vehicle v1 obstructs the course of the host vehicle 20 (step S5: Y), processing returns to step S1 after waiting for the first other vehicle v1 to pass through the intersection. When the course p1 of the first other vehicle v1 does not obstruct the course of the host vehicle 20 (step S5: N), processing proceeds to step S6.

At step S6, the stop prediction unit 53 judges whether or not there is an obstacle on the course p1 of the first other vehicle v1. When there is an obstacle on the course p1 of the first other vehicle v1 (step S6: Y), processing proceeds to step S7. When there is no obstacle on the course p1 of the first other vehicle v1 (step S6: N), processing returns to step S1 after waiting for the first other vehicle v1 to pass through the intersection.

At step S7, the stop prediction unit 53 judges whether or not the first other vehicle v1 will actually stop on the basis of the movement history of the first other vehicle v1. When the first other vehicle v1 stops (step S7: Y), processing proceeds to step S8. When the first other vehicle V1 does not stop (step S7: N), processing returns to step S1 after waiting for the first other vehicle v1 to pass through the intersection.

At step S8, the gap calculation unit 43 calculates the minimum distance d1 of the first gap between an end portion of the vehicle body of the first other vehicle v1 and a surrounding object around the first other vehicle v1 (or the first gap between the end portion of the vehicle body of the first other vehicle v1 and a road edge of the travel lane of the first other vehicle v1). Then, the gap calculation unit 43 sets the calculated minimum distance d1 as the minimum distance of interest D.

At step S9, the slip-through prediction unit 44 judges whether or not the minimum distance of interest D is equal to or less than a predetermined threshold value.

When the minimum distance of interest D is equal to or less than a predetermined threshold value (step S9: Y), processing proceeds to step S13 of FIG. 13B. When the minimum distance of interest D is more than a predetermined threshold value (step S9: N), processing proceeds to step S10.

At step S10, the slip-through prediction unit 44 judges whether or not the second other vehicle v2, which is the following vehicle behind the first other vehicle v1, has been able to be detected. When the second other vehicle v2 can be detected (step S10: Y), processing proceeds to step S11 of FIG. 13B. When the second other vehicle v2 cannot be detected (step S10: N), processing proceeds to step S16 of FIG. 13B.

Figure 13B:
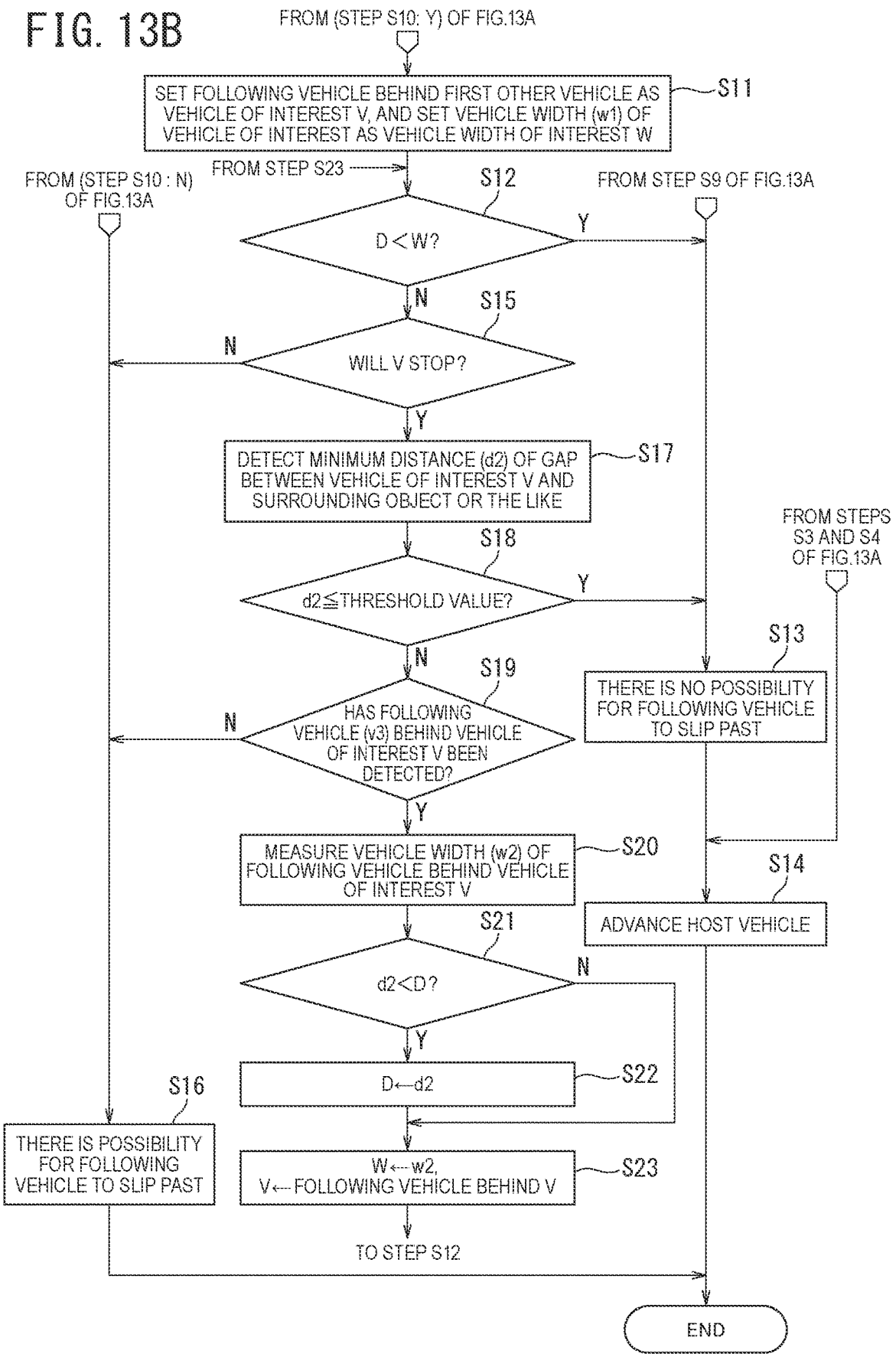
FIG. 13B is a flowchart (2) of the driving assistance method of the embodiment.

Reference will be made to FIG. 13B. At step S11, the slip-through prediction unit 44 sets the second other vehicle v2, which is the following vehicle behind the first other vehicle v1, as a vehicle of interest V.

Additionally, the slip-through prediction unit 44 measures a vehicle width of the vehicle of interest V (i. e., the vehicle width w1 of the second other vehicle v2, and sets to a vehicle width of interest W.

At step S12, the slip-through prediction unit 44 judges whether or not the vehicle width of interest W is longer than the minimum distance of interest D. When the vehicle width of interest W is longer than the minimum distance of interest D (step S12: Y), processing proceeds to step S13. When the vehicle width of interest W is equal to or shorter than the minimum distance of interest D (step S12: N), processing proceeds to step S15.

At step S13, the slip-through prediction unit 44 judges that there is no possibility for a vehicle behind the first other vehicle v1 to slip past the first other vehicle v1 since there is no possibility for the vehicle of interest V to slip through the first gap from behind the first other vehicle v1. The slip-through prediction unit 44 determines to advance the host vehicle 20 to the route p0 to travel through the intersection.

At step S14, the trajectory generation unit 33 generates a travel trajectory for advancing the host vehicle 20 to the route p0 to travel through the intersection. The travel control device 9 controls the actuator 10 on the basis of the travel trajectory generated by the trajectory generation unit 33 to advance the host vehicle 20 to the route p0 to travel through the intersection. After that, processing is ended.

On the other hand, at step S15, the slip-through prediction unit 44 judges whether or not the vehicle of interest V will stop. When the vehicle of interest V stops (step S15: Y), processing proceeds to step S17. When the vehicle of interest V does not stop (step S15: N), processing proceeds to step S16.

At step S16, the slip-through prediction unit 44 judges that the vehicle of interest V may slip through the first gap from behind the first other vehicle v1. In other words, it is judged that the vehicle behind the first other vehicle v1 may slip past the first other vehicle v1. The host vehicle 20 is determined to be stopped before being advanced to the route p0 to travel through the intersection.

Therefore, the trajectory generation unit 33 generates a travel trajectory for stopping the host vehicle 20 at a position for waiting for the vehicle behind the first other vehicle v1 to slip past and overtake the first other vehicle v1 before advancing the host vehicle 20 to the route p0 to travel through the intersection.

The travel control device 9 controls the actuator 10 on the basis of the travel trajectory generated by the trajectory generation unit 33 to stop the host vehicle 20 at the position for waiting for the vehicle behind the first other vehicle v1 to slip past and overtake the first other vehicle v1. After that, processing is ended.

At step S17, the gap calculation unit 43 detects the minimum distance of a gap between an end portion of a vehicle body of the vehicle of interest V and a surrounding object around the vehicle of interest V (or a gap between the end portion of the vehicle body of the vehicle of interest V and a road edge of the travel lane of the vehicle of interest V).

For example, when the vehicle of interest V is the second other vehicle V2, the gap calculation unit 43 detects the minimum distance d2 of the second gap between an end portion of the vehicle body of the second other vehicle v2 and a surrounding object around the second other vehicle v2 (or the second gap between the end portion of the vehicle body of the second other vehicle v2 and a road edge of the travel lane of the second other vehicle v2).

At step S18, the slip-through prediction unit 44 judges whether or not the minimum distance calculated at step S17 is equal to or less than a predetermined threshold value. When the minimum distance is equal to or less than the threshold value (step S18: Y), processing proceeds to step S13. When the minimum distance is more than the threshold value (step S18: N), processing proceeds to step S19.

At step S19, the slip-through prediction unit 44 judges whether or not a following vehicle behind the vehicle of interest V has been able to be detected. For example, when the vehicle of interest V is the second other vehicle v2, the following vehicle behind the vehicle of interest V is the third other vehicle v3.

When the following vehicle behind the vehicle of interest V can be detected (step S19: Y), processing proceeds to step S20. When the following vehicle behind the vehicle of interest V cannot be detected (step S19: N), processing proceeds to step S16.

At step S20, the slip-through prediction unit 44 measures a vehicle width of the following vehicle behind the vehicle of interest V (the vehicle width w2 when the following vehicle behind the vehicle of interest V is the third other vehicle v3).

At step S21, the slip-through prediction unit 44 judges whether or not the minimum distance calculated at step S17 is shorter than the minimum distance of interest D. When the minimum distance calculated at step S17 is shorter than the minimum distance of interest D (step S21: Y), processing proceeds to step S22. When the minimum distance calculated at step S17 is equal to or more than the minimum distance of interest D, step S22 is skipped, and processing proceeds to step S23.

At step S22, the slip-through prediction unit 44 sets the minimum distance calculated at step S17 as the minimum distance of interest D. After that, processing proceeds to step S23.

At step S23, the slip-through prediction unit 44 sets the following vehicle behind the vehicle of interest V as the vehicle of interest V, and sets the vehicle width of the following vehicle behind the vehicle of interest V as the vehicle width of interest W.

Then, processing returns to step S12. Thus, steps S12 to S23 are repeated while sequentially setting vehicles behind the first other vehicle v1 as the vehicle of interest V, and finally, at step S16, it is predicted that a vehicle behind the first other vehicle v1 may slip past the first other vehicle v1 or at step S13, it is predicted that there is no such possibility.

(Effects of Embodiment)

(1) The slip-through prediction unit 44 detects the first other vehicle v1 entering the intersection on the first route 21 where the host vehicle 20 is traveling from the second route 22 different from the first route 21. The stop prediction unit 53 predicts whether or not the first other vehicle v1 will stop in the intersection, and predicts a stop position of the first other vehicle v1 when the first other vehicle v1 is predicted to stop in the intersection. The gap calculation unit 43 calculates the minimum distance d1 of the first gap between the vehicle body of the first other vehicle v1 and a surrounding object around the first other vehicle v1 or between the vehicle body of the first other vehicle v1 and a road edge of the travel lane of the first other vehicle v1 when the first other vehicle v1 is stopped at the predicted stop position. The slip-through prediction unit 44 predicts according to the calculated minimum distance whether or not the second other vehicle, which is the following vehicle behind the first other vehicle, may slip through the first gap from behind the first other vehicle.

As a result, the first other vehicle v1 is detected at the intersection, and it can be estimated whether or not there is a gap beside the first other vehicle v1, through which the following vehicle behind the first other vehicle v1 can pass, according to the first gap between the first other vehicle v1 and the surrounding object (or between the first other vehicle v1 and the road edge). Therefore, for example, even in a situation where the following vehicle is invisible, it can be predicted whether or not the vehicle behind the first other vehicle v1 may slip past the first other vehicle v1, so that safety when proceeding onto the host vehicle route can be confirmed with higher accuracy.

As described above, it can be predicted whether or not the following vehicle behind the first other vehicle v1 may slip past the first other vehicle v1. Therefore, when there is no possibility for the following vehicle to slip past the first other vehicle v1 even when the following vehicle behind the first other vehicle v1 is approaching or invisible, the host vehicle 20 can be advanced into the intersection without waiting for the following vehicle. This can shorten the time required to reach a destination in autonomous driving. Thus, there can be provided an improved travel trajectory generation technology with improved travel trajectory quality for autonomous driving of the host vehicle 20. Furthermore, it is possible to avoid stopping the host vehicle 20 needlessly in order to wait for the following vehicle, which contributes to improvement in fuel efficiency of the host vehicle 20.

(2) When the priority for the host vehicle 20 to travel on the route to pass through the intersection is lower than the priority to travel on the travel lane of the first other vehicle v1, the slip-through prediction unit 44 may predict whether or not the second other vehicle v2 may slip through the first gap from behind the first other vehicle v1.

When the host vehicle 20 has higher priority to pass through the intersection, the host vehicle 20 can pass through the intersection regardless of the second other vehicle v2. In such a case, a calculation load of the controller 8 can be reduced by omitting the prediction of the possibility that the second other vehicle v2 slips through the first gap from behind the first other vehicle v1.

(3) When the calculated minimum distance d1 is equal to or less than a previously determined given threshold value, the slip-through prediction unit 44 may predict that there is no possibility for the second other vehicle v2 to slip through the first gap from behind the first other vehicle v1. As a result, it can be predicted that there is no possibility for the second other vehicle v2 to slip through the first gap from behind the first other vehicle v1.

(4) The slip-through prediction unit 44 detects the vehicle width w1 of the second other vehicle v2, and when the detected vehicle width w1 of the second other vehicle v2 is longer than the calculated minimum distance d1, the slip-through prediction unit 44 may predict that there is no possibility for the second other vehicle v2 to slip through the first gap from behind the first other vehicle v1. As a result, it can be predicted that there is no possibility for the second other vehicle v2 to slip through the first gap from behind the first other vehicle v1.

(5) When there is an obstacle on the course of the first other vehicle v1, the stop prediction unit 53 may predict that the first other vehicle v1 will stop in the intersection. As a result, it can be judged whether or not the first other vehicle v1 will stop, and it can be judged whether the second other vehicle v2 will proceed slipping past the first other vehicle v1 or wait for the first other vehicle v1 to proceed.

(6) The obstacle on the course of the first other vehicle v1 may be a preceding vehicle ahead of the first other vehicle v1, a traffic jam ahead on the course of the first other vehicle v1, another vehicle traveling on a course intersecting with the course of the first other vehicle v1, the host vehicle 20, or a pedestrian on the course of the first other vehicle v1.

As a result, it can be judged whether or not the first other vehicle v1 will stop due to any of the listed obstacles, and it can be judged whether the second other vehicle v2 will proceed slipping past the first other vehicle v1 or wait for the first other vehicle v1 to proceed.

(7) When the first gap is a gap between the vehicle body of the first other vehicle v1 and a surrounding object, the gap calculation unit 43 may sequentially select each of the plurality of points p1 to p6 on the outer peripheral surface of the vehicle body of the first other vehicle v1, determine each combination of the selected point and the plurality of points p21 to p26 on the outer peripheral surface of the surrounding object, and calculate the smallest distance among distances between the points in the determined combinations as the minimum distance d1 of the first gap.

This enables it to appropriately obtain the distance of the gap for predicting whether the following vehicle can slip therethrough.

(8) When the first gap is a gap between the vehicle body of the first other vehicle v1 and a road edge of the travel lane of the first other vehicle v1, the gap calculation unit 43 may sequentially select each of the plurality of points p1 to p7 on the outer peripheral surface of the vehicle body of the first other vehicle v1, determine each combination of the selected point and the plurality of points p11 to p16 on the road edge, and calculate the smallest distance among the distances between the points in the determined combinations as the minimum distance d1 of the first gap.

This enables it to appropriately obtain the distance of the gap for predicting whether the following vehicle can slip therethrough.

(9) The road edge may be a wall, a curb, a guardrail, a utility pole, or a road sign. This enables it to predict whether or not the following vehicle will slip through a gap between the first other vehicle v1 and the road edge when the road edge is defined by any of these objects that physically hinder travel of the following vehicle.

In addition, the road edge may be a traffic lane line prohibiting lane changes. This enables it to predict whether or not the following vehicle will slip through a gap between the first other vehicle v1 and the traffic lane line when crossing the traffic lane line is prohibited.

[(10) The slip-through prediction unit 44 may detect the vehicle width w2 of the third other vehicle v3, which is the following vehicle behind the second other vehicle v2. The gap calculation unit 43 may calculate the minimum distance d2 of the second gap between the vehicle body of the second other vehicle v2 and a surrounding object around the second other vehicle v2 or between the vehicle body of the second other vehicle v2 and a road edge of the travel lane of the second other vehicle v2. The slip-through prediction unit 44 may predict that there is no possibility for the third other vehicle v3 to slip through the first gap from behind the first other vehicle v1 when the vehicle width w2 of the third other vehicle is longer than a smaller distance of the minimum distance d1 of the first gap and the minimum distance d2 of the second gap.

As a result, when the third other vehicle v3, which is the further following vehicle, is behind the second other vehicle v2, it can be estimated whether or not there is a gap through which the third other vehicle v3 can overtake the first other vehicle v1. This enables it to predict whether or not the third other vehicle v3 may slip past the first other vehicle v1, so that safety when proceeding onto the host vehicle route can be confirmed with higher accuracy.

(11) When the slip-through prediction unit 44 predicts that there is no possibility for another vehicle to slip through the first gap from behind the first other vehicle v1, the travel control device 9 may advance the host vehicle 20 to the planned route to travel in the intersection.

By doing this, the host vehicle 20 can be advanced with the safety of the route of the host vehicle 20 ensured.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1: Driving assistance device
2: Sensor unit
3: Positioning unit
4: Map database
5: Communication unit
6: Navigation device 7: Output unit
8: Controller
9: Travel control device
10: Actuator
11: Processor
12: Storage device
30: Object recognition unit
31: Self-position estimation unit
32: Driving behavior determination unit
33: Trajectory generation unit
40: Intersection information management unit
41: Other vehicle course prediction unit
42: Other vehicle/surrounding information management unit
43: Gap calculation unit
44: Slip-through prediction unit
50: Host vehicle priority information
51: Road edge information
52: Course prediction unit
53: Stop prediction unit
54: Surrounding object information
55: Other vehicle end information

The invention claimed is:

1. A driving assistance method comprising:
detecting a first other vehicle entering an intersection on a first route where a host vehicle is traveling from a second route different from the first route;
predicting whether or not the first other vehicle will stop in the intersection, and predicting a stop position of the first other vehicle when the first other vehicle is predicted to stop in the intersection;
calculating a minimum distance of a first gap between a vehicle body of the first other vehicle and a surrounding object around the first other vehicle or between the vehicle body of the first other vehicle and a road edge of a travel lane of the first other vehicle when the first other vehicle stops at the predicted stop position;
predicting according to the calculated minimum distance whether or not a second other vehicle, which is a following vehicle behind the first other vehicle, can slip through the first gap from behind the first other vehicle; and
controlling travel of the host vehicle based on a result of the predicting.

2. The driving assistance method according to claim 1, wherein when a priority for the host vehicle to travel on a route to pass through the intersection is lower than a priority to travel on the travel lane of the first other vehicle, it is predicted whether or not the second other vehicle can slip through the first gap from behind the first other vehicle.

3. The driving assistance method according to claim 1, wherein when the calculated minimum distance is equal to or less than a previously determined given threshold value, it is predicted that there is no possibility for the second other vehicle to slip through the first gap from behind the first other vehicle.

4. The driving assistance method according to claim 1, comprising detecting a vehicle width of the second other vehicle, wherein when the detected vehicle width of the second other vehicle is longer than the calculated minimum distance, it is predicted that there is no possibility for the second other vehicle to slip through the first gap from behind the first other vehicle.

5. The driving assistance method according to claim 1, wherein when there is an obstacle on a course of the first other vehicle, the first other vehicle is predicted to stop in the intersection.

6. The driving assistance method according to claim 5, wherein the obstacle on the course of the first other vehicle is a preceding vehicle ahead of the first other vehicle, another vehicle traveling on a course intersecting with the course of the first other vehicle, the host vehicle, or a pedestrian on the course of the first other vehicle.

7. The driving assistance method according to claim 1, wherein when the first gap is a gap between the vehicle body of the first other vehicle and the surrounding object around the first other vehicle, each of a plurality of points on an outer peripheral surface of the vehicle body of the first other vehicle is sequentially selected, each combination of a selected point and a plurality of points on an outer peripheral surface of the surrounding object is determined, and a smallest distance among distances between points in determined combinations is calculated as the minimum distance of the first gap.

8. The driving assistance method according to claim 1, wherein when the first gap is a gap between the vehicle body of the first other vehicle and the road edge of the travel lane of the first other vehicle, each of a plurality of points on an outer peripheral surface of the vehicle body of the first other vehicle is sequentially selected, each combination of the selected point and a plurality of points on the road edge is determined, and a smallest distance among distances between the points in the determined combinations is calculated as the minimum distance of the first gap.

9. The driving assistance method according to claim 1, wherein the road edge is a wall, a curb, a guardrail, a utility pole, a road sign, or a traffic lane line prohibiting lane changes.

10. The driving assistance method according to claim 1, further comprising:
detecting a vehicle width of a third other vehicle, which is a following vehicle behind the second other vehicle; and
calculating a minimum distance of a second gap between a vehicle body of the second other vehicle and a surrounding object around the second other vehicle or between the vehicle body of the second other vehicle and a road edge of the travel lane of the second other vehicle, wherein when the vehicle width of the third other vehicle is longer than a smaller distance of the minimum distance of the first gap and the minimum distance of the second gap, it is predicted that there is no possibility for the third other vehicle to slip through the first gap from behind the first other vehicle.

11. The driving assistance method according to claim 1, wherein when the result of the predicting is that there is no possibility for another vehicle to slip through the first gap from behind the first other vehicle, the travel of the host vehicle is advanced to a planned route to travel in the intersection.

12. The driving assistance method according to claim 1, wherein when the result of the predicting is that there is a possibility for the second other vehicle to slip through the first gap from behind the first other vehicle, the travel of the host vehicle is controlled to stop the host vehicle at a position for waiting.

13. A driving assistance device comprising:
a sensor configured to detect a first other vehicle entering an intersection on a first route where a host vehicle is traveling from a second route different from the first route; and
a controller configured to:
predict whether or not the first other vehicle will stop in the intersection;

predict a stop position of the first other vehicle when the first other vehicle is predicted to stop in the intersection;

calculate a minimum distance of a first gap between a vehicle body of the first other vehicle and a surrounding object around the first other vehicle or between the vehicle body of the first other vehicle and a road edge of a travel lane of the first other vehicle; and predict according to the calculated minimum distance whether or not a second other vehicle, which is a following vehicle behind the first other vehicle, can slip through the first gap from behind the first other vehicle; and control travel of the host vehicle based on a prediction result.

* * * * *